(12) United States Patent
Sheppard et al.

(10) Patent No.: US 11,595,265 B2
(45) Date of Patent: *Feb. 28, 2023

(54) SYSTEMS AND METHODS FOR CREATING PRIORITY-BASED REGULATED NETWORK INTERLINKS BETWEEN ELECTRONIC DEVICES

(71) Applicant: Intelligent Communication Assistant, Inc., Chicago, IL (US)

(72) Inventors: Raymond J. Sheppard, Spring Hill, FL (US); Robert L. Fike, Hawthorn Woods, IL (US)

(73) Assignee: Intelligent Communication Assistant, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,583

(22) Filed: Jul. 25, 2022

(65) Prior Publication Data

US 2022/0376986 A1 Nov. 24, 2022

Related U.S. Application Data

(63) Continuation-in-part of application No. 17/480,321, filed on Sep. 21, 2021, now Pat. No. 11,431,725, and
(Continued)

(51) Int. Cl.
| | | |
|---|---|---|
| *H04L 41/12* | (2022.01) | |
| *H04L 67/30* | (2022.01) | |
| *H04L 67/50* | (2022.01) | |
| *H04L 41/06* | (2022.01) | |
| *H04L 67/60* | (2022.01) | |

(52) U.S. Cl.
CPC .............. *H04L 41/12* (2013.01); *H04L 41/06* (2013.01); *H04L 67/30* (2013.01); *H04L 67/535* (2022.05); *H04L 67/60* (2022.05)

(58) Field of Classification Search
CPC ......... H04L 41/12; H04L 41/06; H04L 67/30; H04L 67/535; H04L 67/60
See application file for complete search history.

(56) References Cited

U.S. PATENT DOCUMENTS

| | | | |
|---|---|---|---|
| 8,089,943 B2 * | 1/2012 | Lim ..................... | H04L 63/02 705/14.64 |
| 10,282,798 B2 * | 5/2019 | Sheppard .............. | G06Q 50/16 |

(Continued)

*Primary Examiner* — Ramy M Osman
(74) *Attorney, Agent, or Firm* — Marin Patents LLC; Gustavo Marin

(57) ABSTRACT

A system and method for creating priority-based regulated network interlinks between electronic devices is disclosed. The system receives a communication request from a first device to communicate with a second device and identifies whether the first device is comprised within a primary affinity group associated with the second device. If the first device is not found in the primary affinity group one or more secondary affinity groups are identified, each secondary affinity group associated with an electronic device different than the first and second devices. Based on scoring of each secondary affinity group, handling criteria for the communication object is determined and used to create a network interlink between the first device and the second device.

20 Claims, 13 Drawing Sheets

Related U.S. Application Data a continuation-in-part of application No. 16/553,072, filed on Aug. 27, 2019, now Pat. No. 11,431,574.

(60) Provisional application No. 63/082,335, filed on Sep. 23, 2020, provisional application No. 62/723,414, filed on Aug. 27, 2018.

(56) References Cited

U.S. PATENT DOCUMENTS

| | | | |
|---|---|---|---|
| 10,846,658 B2* | 11/2020 | Oberle | H04L 51/48 |
| 11,224,006 B2* | 1/2022 | Ljung | H04L 5/0048 |
| 11,283,749 B2* | 3/2022 | He | H04L 12/1813 |
| 11,431,574 B2* | 8/2022 | Sheppard | H04L 41/142 |
| 11,431,725 B2* | 8/2022 | Sheppard | H04M 3/42008 |
| 11,431,726 B2* | 8/2022 | Sheppard | H04L 63/104 |
| 2010/0250344 A1* | 9/2010 | Polston | G06Q 40/12 |
| | | | 705/317 |
| 2012/0101901 A1* | 4/2012 | Depasquale | G06Q 30/0271 |
| | | | 705/14.58 |
| 2012/0316989 A1* | 12/2012 | Wong | G06Q 30/0639 |
| | | | 705/26.9 |
| 2013/0232015 A1* | 9/2013 | Watanabe | G06Q 30/0277 |
| | | | 705/14.73 |
| 2014/0095393 A1* | 4/2014 | Nightengale | H04L 61/5007 |
| | | | 705/44 |
| 2015/0317581 A1* | 11/2015 | Fawaz | G06Q 10/0639 |
| | | | 705/313 |
| 2015/0358266 A1* | 12/2015 | Kaplinger | H04L 51/212 |
| | | | 709/206 |
| 2019/0149527 A1* | 5/2019 | John | H04L 63/0435 |
| | | | 713/171 |

\* cited by examiner

SYSTEMS AND METHODS FOR CREATING PRIORITY-BASED REGULATED NETWORK INTERLINKS BETWEEN ELECTRONIC DEVICES

CROSS-REFERENCE TO RELATED APPLICATIONS

This application is a continuation-in-part of U.S. application Ser. No. 17/480,321 titled, "SYSTEMS AND METHODS FOR DYNAMIC NETWORK PAIRINGS TO ENABLE END-TO-END COMMUNICATIONS BETWEEN ELECTRONIC DEVICES" filed on Sep. 21, 2021 which claims the benefit of, and priority to U.S. provisional application 63/082,335 titled, "SYSTEM AND METHOD FOR MULTIMODAL CONCURRENT COMMUNICATIONS FOR A PLURALITY OF ANONYMOUS ENDPOINTS" filed on Sep. 23, 2020, and this application is a continuation-in-part of U.S. application Ser. No. 16/553,072 titled, "SYSTEM AND METHOD FOR HIERARCHICAL RELATIONSHIP MATRIX OPPORTUNITY SCORING" filed on Aug. 27, 2019 which claims the benefit of, and priority to U.S. provisional application 62/723,414 titled, "SYSTEM AND METHOD FOR HIERARCHICAL RELATIONSHIP MATRIX OPPORTUNITY SCORING" filed on Aug. 27, 2018, the entire specifications of which are incorporated herein by reference.

BACKGROUND OF THE INVENTION

Field of the Art

The disclosure relates to the field of communication network solutions for facilitating priority-based regulated network interlink(s) between electronic communication devices.

Discussion of the State of the Art

Communication is fundamental to all human interactions. A vast number of communications now take place through a variety of electronic channels including email, chat, SMS (text messaging), AI-based chatbot, and social media with traditional mail, wireless, and landline telephone use decreasing. These communications skip from channel to channel, with text messages posted to social media, links in email opening into chat platforms, a voice message is converted to text and emailed to the recipient. Once a person's contact information becomes known, any marketer or scammer with the phone number, email address, or social media account information can send any number of unwanted solicitations making it challenging to distinguish wanted from unwanted communications. These open channels create issues for individuals concerned about protecting their privacy and personal information as their data is mined and sold to anyone willing to pay for their contact information.

What is needed in the art are systems and methods for priority-based regulated network interlinks between electronic communications devices that facilitate complete user control and anonymity for the end-user.

SUMMARY OF THE INVENTION

Accordingly, the inventor has conceived and reduced to practice, in a preferred embodiment of the invention, a system and method of structuring a communication network that meets the need for communication devices to maintain a desired level of privacy with end-user control, real-time control over communication channels through which communication devices are paired in a network pairing, as well as complete anonymity for the end-user. All other existing communication networks focus on creating an interconnecting network that connects endpoint addresses, so any endpoint address can access a network and connect to any other endpoint address. They are entirely focused on creating a complete, interconnected mesh of endpoints that leaves the individual user and their personal information vulnerable to misuse and abuse. The methods and systems presented herein solve that problem by providing a dynamic and risk averse mode of connecting communication devices.

According to a preferred embodiment, the systems and method disclosed herein may gather data associated with one or more communication devices such that the more data being gathered may result in increased efficiency of the systems and methods to carry out the embodiments disclosed herein. For instance, especially, in scenarios wherein inadequate or unreliable data between a first device and a second device is identified, and/or wherein a subscriber device may have a small or non-existent affinity group, the systems and methods disclosed herein may aggregate data from other like subscriber devices along with the direct and non-direct affinity groups in the hierarchy of other subscribing devices, including but not limited to data available from the non-subscribing or requesting devices attempting to pair with any subscriber device, as disclosed in the text that follows.

According to a preferred embodiment of the invention, a system for creating priority-based regulated network interlinks between electronic devices. The system comprises a network-connected communication computer comprising a memory and a processor and further comprising programmable instructions stored in the memory. The instructions are executed by the processor to receive, from a first device, a communication object at least comprising a request to communicate with a second device; identify whether the first device is comprised within a primary affinity group associated with the second device; in response to a determination that the primary affinity group does not comprise the first device, identify one or more secondary affinity groups, each secondary affinity group associated with an electronic device different than the first and second devices; across all secondary affinity groups identified, compute an aggregated internal affinity group score for the first device; determine whether the aggregated internal affinity group score is greater than a first predetermined threshold value; in response to a determination that the aggregated internal affinity group score is greater than the first predetermined threshold value, determine handling criteria for the communication object; create a network interlink between the first device and the second device based on the handling criteria; and transmit, via the network interlink, the communication object to the second device.

According to another preferred embodiment of the invention, the aggregated internal affinity group score for across all secondary affinity groups is computed using one or more of: a counter value assigned to a secondary affinity group; a total number of the one or more secondary affinity groups being aggregated; a quantified measure of volume of interactions for the first device found within the secondary affinity group; and a weighted value of the secondary affinity group derived using a hierarchal index linked to the second device.

According to another preferred embodiment of the invention, the hierarchal index for the second device is generated based on a relevance score of a communication device to which the secondary affinity group belongs, the relevance score defining a quantitative value of familiarity of the second device with the communication device.

According to another preferred embodiment of the invention, the processor further executes the instructions to compute a restricted access value for the first device using one or more of: the counter value assigned to the secondary affinity group; the total number of the one or more secondary affinity groups being aggregated; a count of restricted access events identified for the first device in a given secondary affinity group;

the weighted value of the secondary affinity group derived using the hierarchal index linked to the second device; and augment the determination of the handling criteria for the communication object based on the restricted access value.

According to another preferred embodiment of the invention, the programming instructions when further executed by the processor, cause the processor to: in response to a determination that the primary affinity group does not comprise the first device, identify one or more external affinity groups from a plurality of external networks, each external affinity group associated with an electronic device different than the first and second devices; across all external affinity groups identified, compute an aggregated external affinity group score for the first device; determine whether the aggregated external affinity group score is greater than a second predetermined threshold value; and in response to a determination that the aggregated external affinity group score is greater than the second predetermined threshold value, determine the handling criteria for the communication object.

According to another preferred embodiment of the invention, the programming instructions when further executed by the processor, cause the processor to: compute a confidence score for the first device using one or more of the aggregated internal affinity group score, the restricted access value, and the aggregated external affinity group score; compute an identity score for the first device based at least in part on the confidence score; and augment, based at least in part on the identity score, the determination of the handling criteria for the communication object.

According to another preferred embodiment of the invention, the aggregated external affinity group score is computed using one or more of: a counter value of each external network; total number of the plurality of external networks being aggregated; a counter value of each external affinity group identified within an external network; a total number of the one or more external affinity groups being aggregated; a quantified measure of a volume of interactions for the first device found within a given external affinity group; a sentiment analysis score for the first device within the external affinity group; and a weighted value of the external affinity group derived using a hierarchal index linked to the second device.

According to another preferred embodiment of the invention, in response to a determination that the primary affinity comprises the first device, the programming instructions when further executed by the processor, cause the processor to: identify identification information and historic data associated with the communication object; determine whether the communication object has a valid permission token associated therewith; in response to a determination that the communication object does not have a valid permission token associated therewith, determine whether at least one subscriber filter criterion is met by the first device; in response to a determination that the at least one subscriber filter criterion is met by the first device, calculate a subscriber access score for the first device; and augment, based on the subscriber access score, the determination of the handling criteria for the communication object.

According to another preferred embodiment of the invention, the programming instructions when further executed by the processor, cause the processor to: in response to a determination that the valid permission token is associated with the communication object, transmit the communication object to the second device by creating the network interlink between the first device and the second device.

According to another preferred embodiment of the invention, the programming instructions when further executed by the processor, cause the processor to: in response to the determination that the valid permission token is associated with the communication object, determine whether the first device is authorized; and if the first device is authorized, forward communication object to be displayed on a graphical user interface and/or audio interface of the second device, based at least on a type of the communication object.

According to another preferred embodiment of the invention, a computer-implemented method for creating priority-based regulated network interlinks between electronic devices is disclosed. The method comprises: receiving, from a first device by a communication control computer, a communication object at least comprising a request to communicate with a second device; identifying, by the communication control computer, whether the first device is comprised within a primary affinity group associated with the second device; in response to determining, by the communication control computer, that the primary affinity group does not comprise the first device, identifying, by the communication control computer, one or more secondary affinity groups, each secondary affinity group associated with an electronic device different than the first and second devices; across all secondary affinity groups identified, computing, by the communication control computer, an aggregated internal affinity group score for the first device; determining, by the communication control computer, whether the aggregated internal affinity group score is greater than a first predetermined threshold value; in response to determining that the aggregated internal affinity group score is greater than the first predetermined threshold value, determining, by the communication control computer, handling criteria for the communication object; creating, by the communication control computer, a network interlink between the first device and the second device based on the handling criteria; and transmitting, by the communication control computer via the network interlink, the communication object to the second device.

According to another preferred embodiment of the invention, the method further comprises computing, by the communication control computer, the aggregated internal affinity group score using one or more of: a counter value assigned to a secondary affinity group; a total number of the one or more secondary affinity groups being aggregated; a quantified measure of volume of interactions for the first device found within the secondary affinity group; and a weighted value of the secondary affinity group derived using a hierarchal index linked to the second device.

According to another preferred embodiment of the invention, the method further comprises generating, by the communication control computer, the hierarchal index for the second device based on a relevance score of a communication device to which the secondary affinity group belongs, the relevance score defining a quantitative value of familiarity of the second device with the communication device.

According to another preferred embodiment of the invention, the method further comprises computing, by the communication control computer, a restricted access value for the first device using one or more of: the counter value assigned to the secondary affinity group; the total number of the one or more secondary affinity groups being aggregated; a count of restricted access events identified for the first device in a given secondary affinity group; the weighted value of the secondary affinity group derived using the hierarchal index linked to the second device; and augment the determination of the handling criteria for the communication object based on the restricted access value.

According to another preferred embodiment of the invention, the method further comprises, in response determining, by the communication control computer, that the primary affinity group does not comprise the first device, identifying, by the communication control computer, one or more external affinity groups from a plurality of external networks, each external affinity group associated with an electronic device different than the first and second devices; across all external affinity groups identified, computing, by the communication control computer, an aggregated external affinity group score for the first device; determining, by the communication control computer, whether the aggregated external affinity group score is greater than a second predetermined threshold value; and in response to determining, by the communication control computer, that the aggregated external affinity group score is greater than the second predetermined threshold value, determining, by the communication control computer, the handling criteria for the communication object.

According to another preferred embodiment of the invention, the method further comprises computing, by the communication control computer, a confidence score for the first device using one or more of the internal affinity group score, the restricted access value, and the aggregated external affinity group score; computing, by the communication control computer, an identity score for the first device based at least in part on the confidence score; and augmenting, by the communication control computer, based at least in part on the identity score, determination of the handling criteria for the communication object.

According to another preferred embodiment of the invention, the method further comprises computing, by the communication control computer, the aggregated external affinity group score using one or more of: a counter value of each external network; a total number of the plurality of external networks being aggregated; a counter value of each external affinity group identified within an external network; a total number of the one or more external affinity groups being aggregated; a quantified measure of a volume of interactions for the first device found within a given external affinity group; a sentiment analysis score for the first device within the external affinity group; and a weighted value of the external affinity group derived using a hierarchal index linked to the second device.

According to another preferred embodiment of the invention, in response to determining, by the communication control computer, that the primary affinity comprises the first device, the method further comprising: identifying, by the communication control computer, identification information and historic data associated with the communication object; determining, by the communication control computer, whether the communication object has a valid permission token associated therewith; in response to determining, by the communication control computer, that the communication object does not have a valid permission token associated therewith, determining, by the communication control computer, whether at least one subscriber filter criterion is met by the first device; in response to determining, by the communication control computer, that the at least one subscriber filter criterion is met by the first device, calculating, by the communication control computer, a subscriber access score for the first device; and augmenting, by the communication control computer, based on the subscriber access score, determination of the handling criteria for the communication object.

According to another preferred embodiment of the invention, the method further comprises, in response determining, by the communication control computer, that the valid permission token is associated with the communication object, transmitting, by the communication control computer, the communication object to the second device by creating the network interlink between the first device and the second device.

According to another preferred embodiment of the invention, the method further comprises, in response to determining, by the communication control computer, that the valid permission token is associated with the communication object, determining, by the communication control computer, whether the first device is authorized; and if the first device is authorized, forwarding, by the communication control computer, communication object to be displayed on a graphical user interface and/or audio interface of the second device, based at least on a type of the communication object.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

Figure 7A:
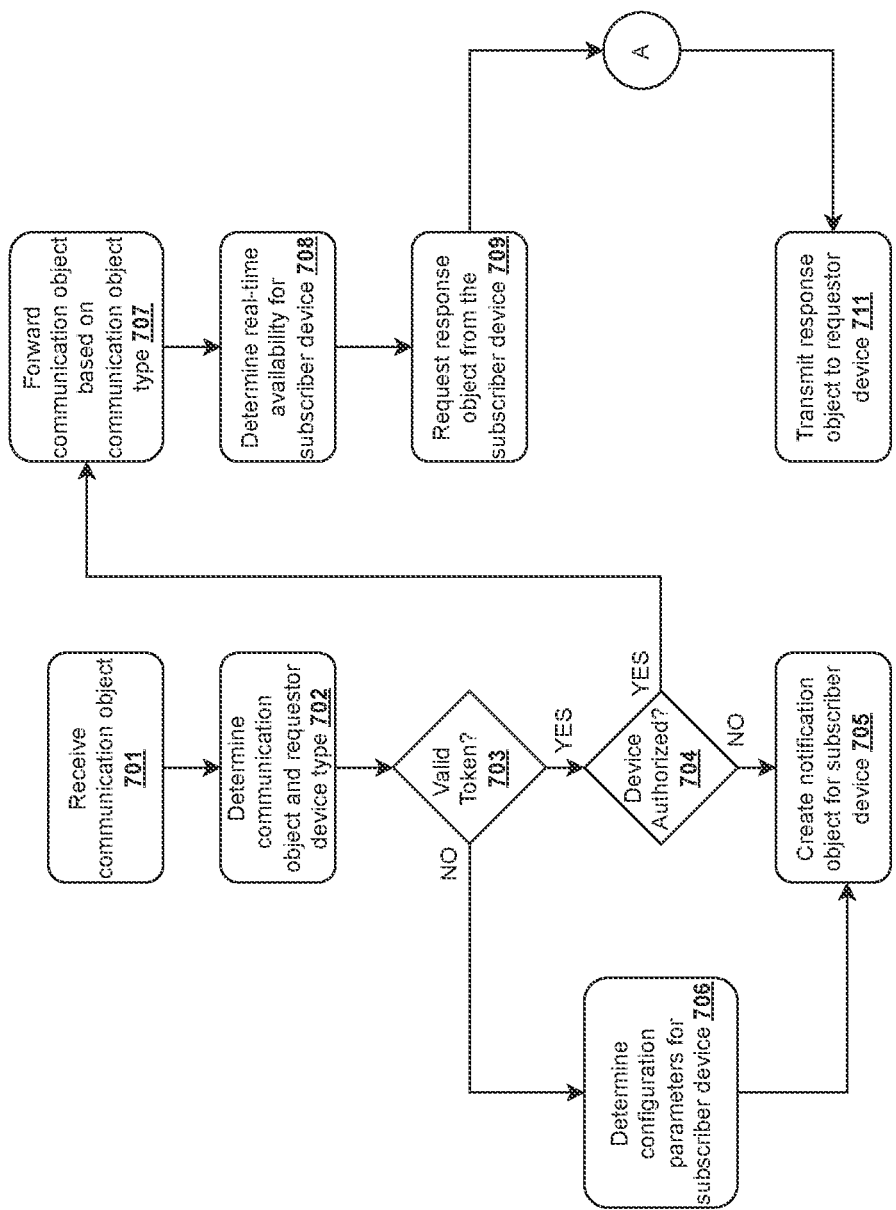
Figure 7B:
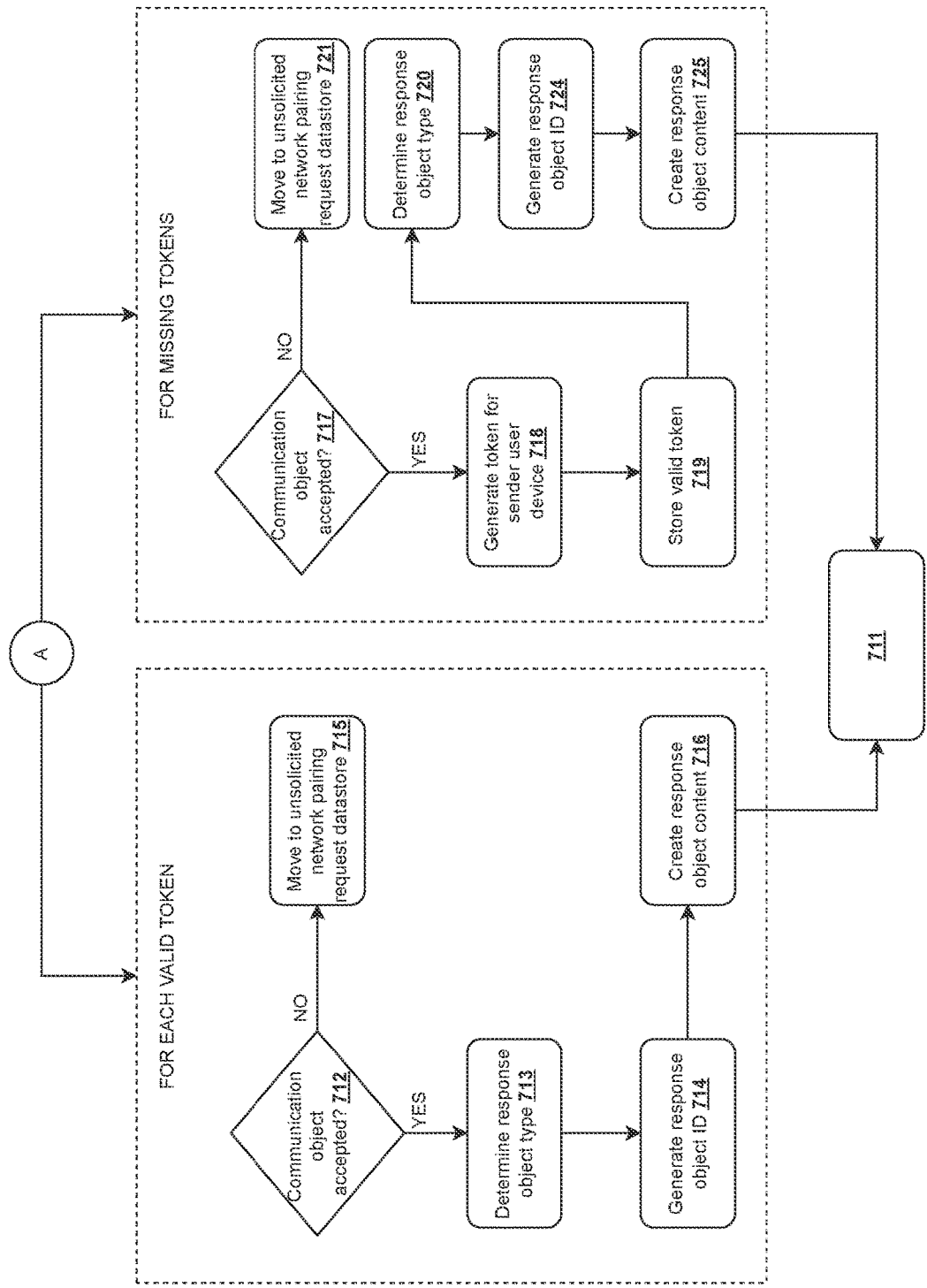
Figure 8:
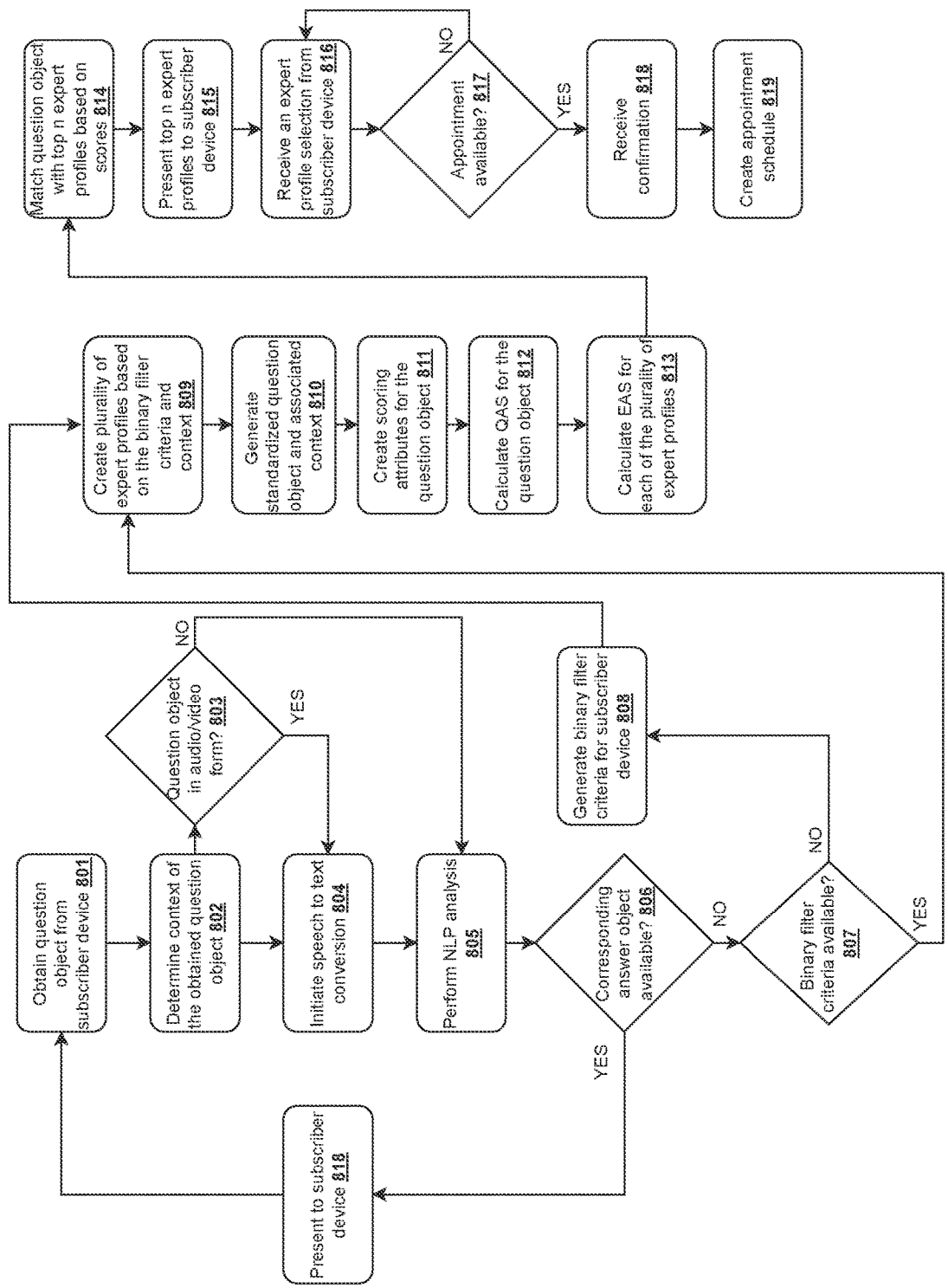
Figure 9:
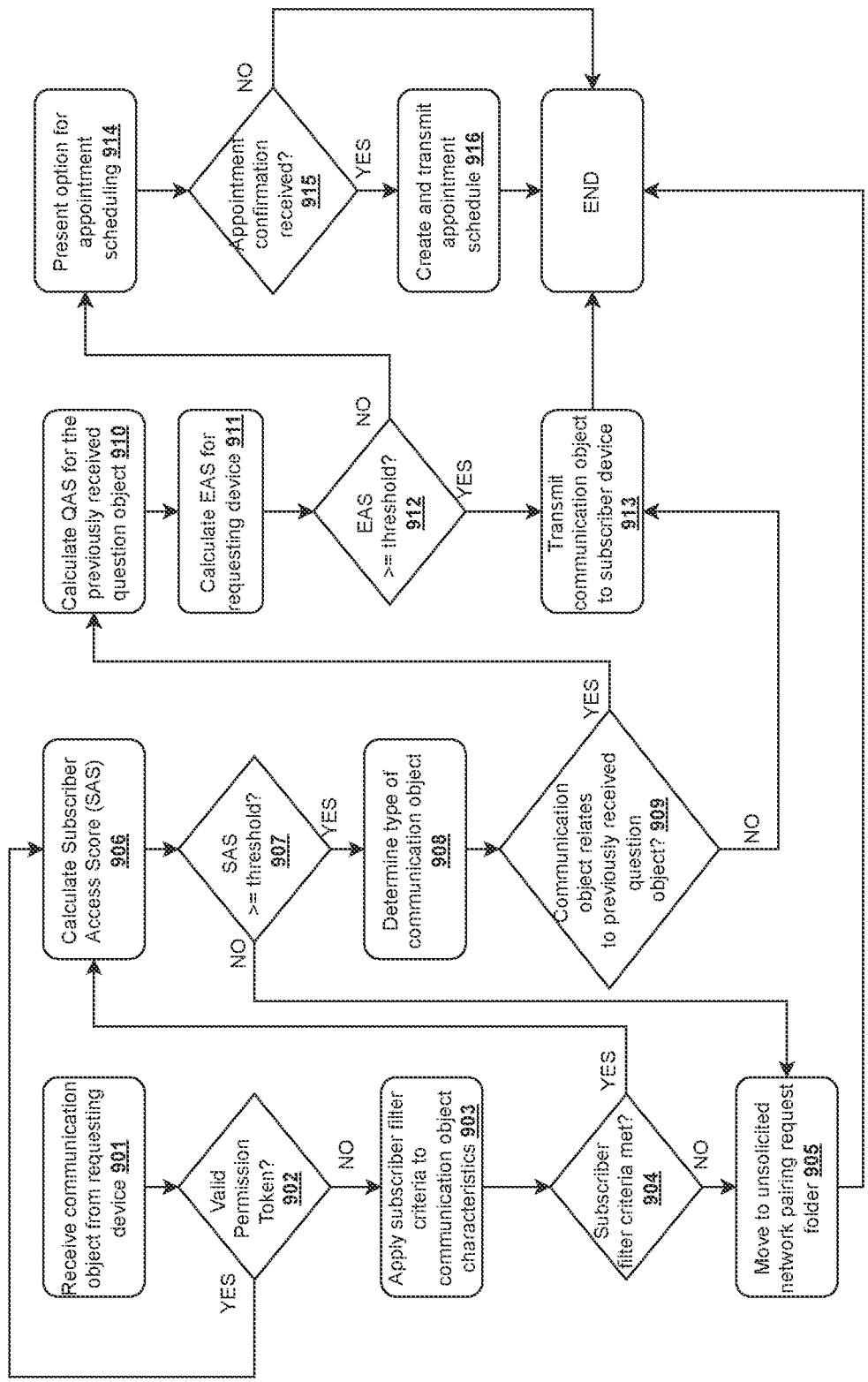
Figure 10:
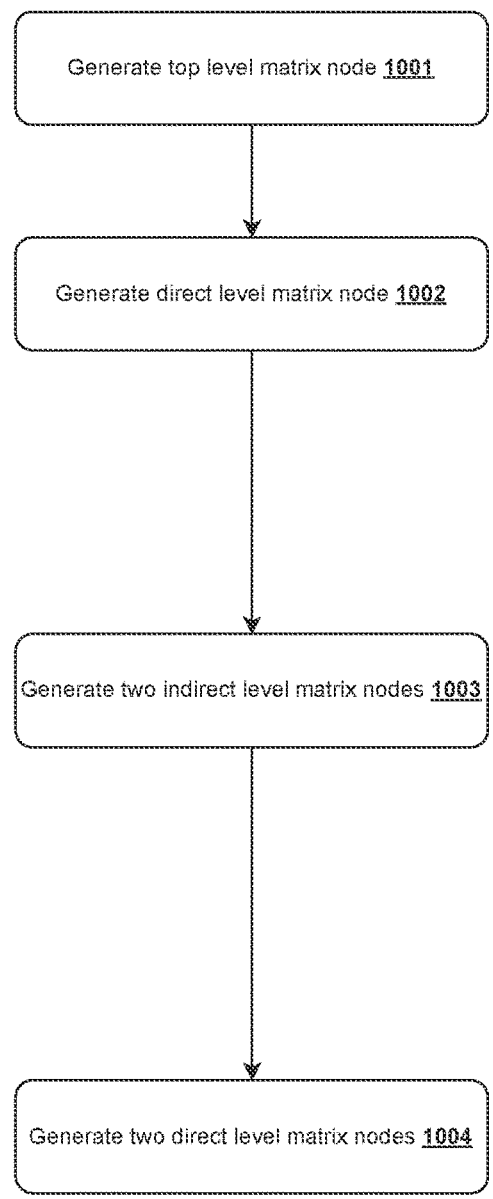
Figure 10:
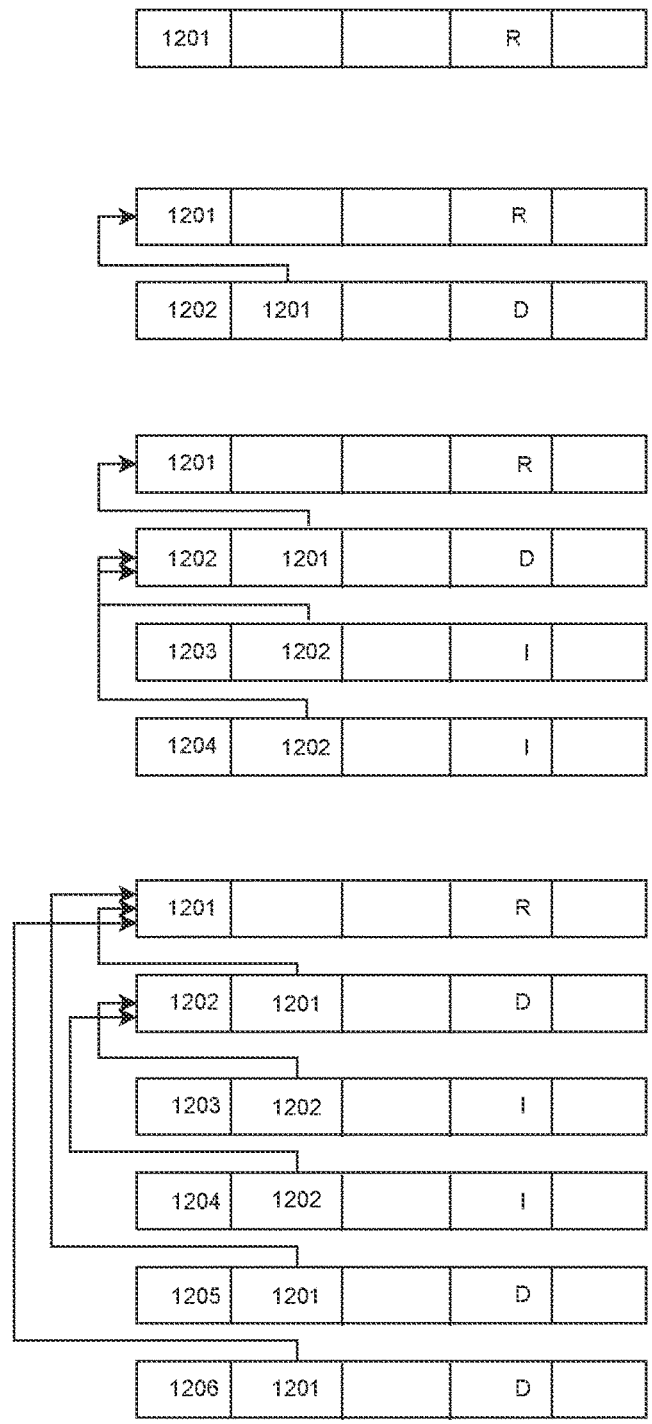

FIGS. 7A-B illustrate an exemplary method for processing a communication object within a dynamic network pairing between requesting devices and subscriber devices, according to a preferred embodiment of the present invention;

FIG. 8 illustrates an exemplary method for processing a communication object, comprising at least a question object, within a dynamic network pairing between one or more expert devices and a subscriber device, according to a preferred embodiment of the present invention;

FIG. 9 illustrates an exemplary method for processing a communication object for creation of a dynamic network pairing between one or more expert devices and a subscriber device, according to a preferred embodiment of the present invention; and FIG. 10 illustrates a block diagram for a relationship matrix construction comprising subscriber devices and expert devices, according to a preferred embodiment of the invention.

Figure 11:
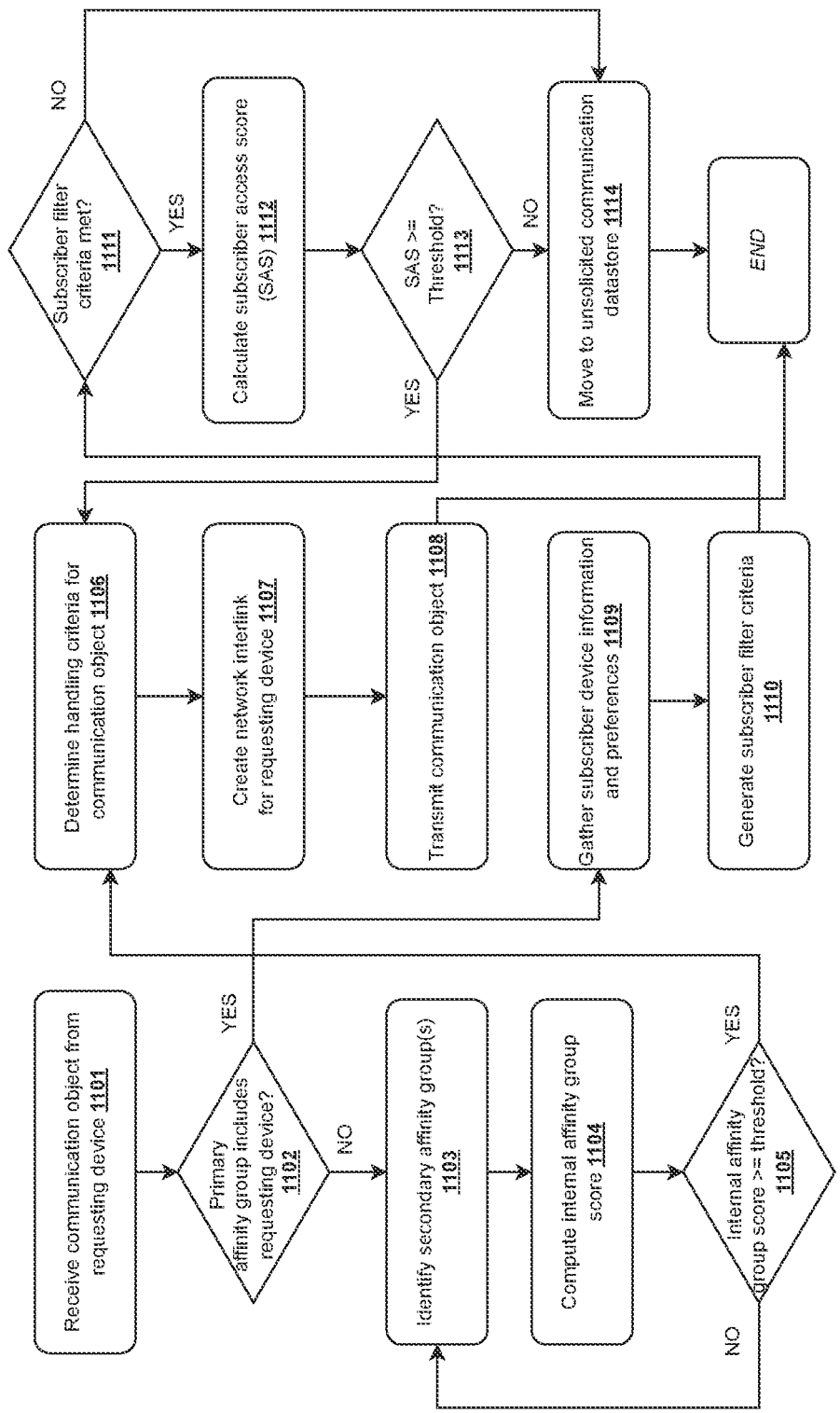

FIG. 11 illustrates an exemplary method for creating regulated network interlinks between electronic communication devices using internal affinity groups, according to a preferred embodiment of the invention.

Figure 12:
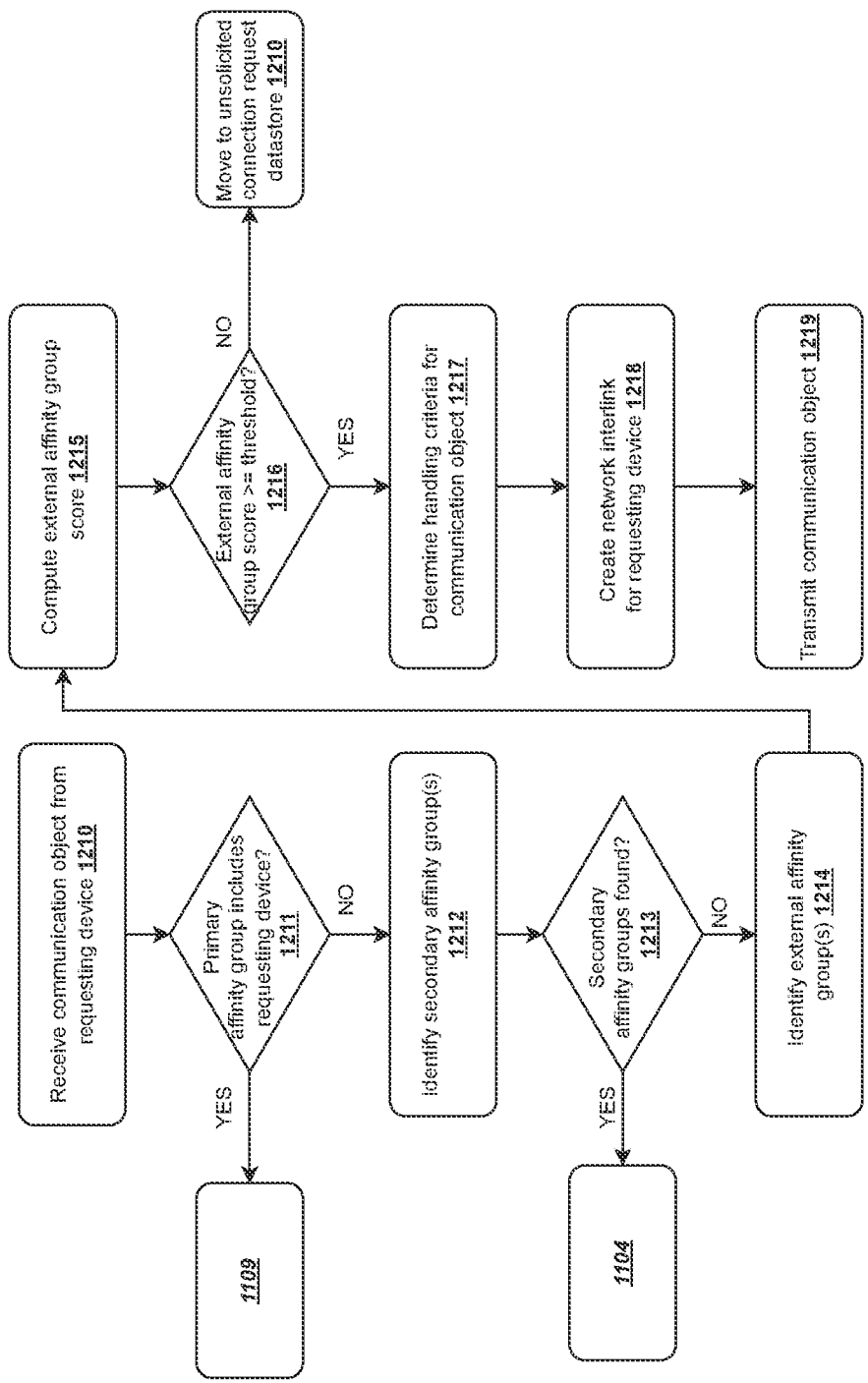

FIG. 12 illustrates an exemplary method for creating regulated network interlinks between electronic communication devices using external affinity groups is, according to a preferred embodiment of the invention

DETAILED DESCRIPTION

The inventor has conceived, and reduced to practice, a system and method to configure dynamic network pairings between communication devices that may mitigate unsolicited network pairing attempts through unknown or unverified devices, thereby enabling complete end-user control and maintaining anonymity for subscriber devices.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and to more fully illustrate one or more aspects of the inventions. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
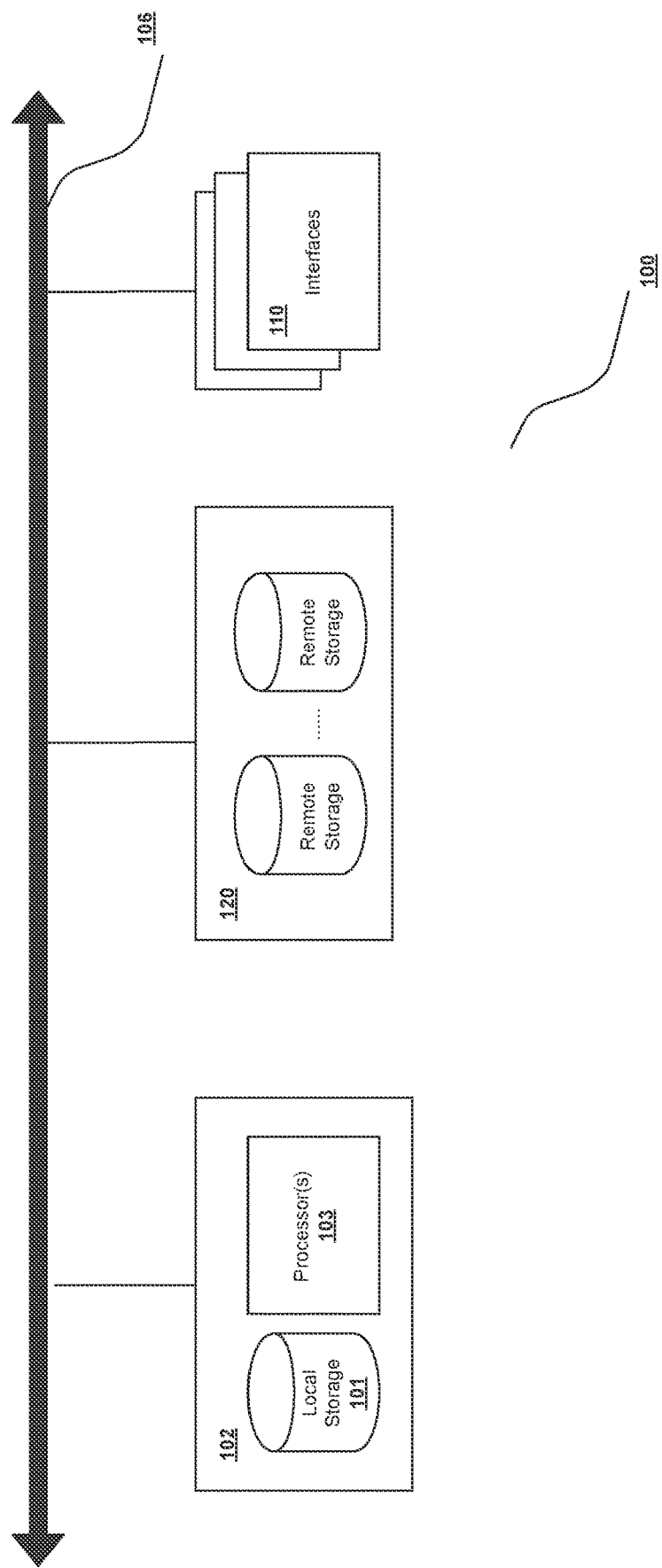
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a subscriber device 513 (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
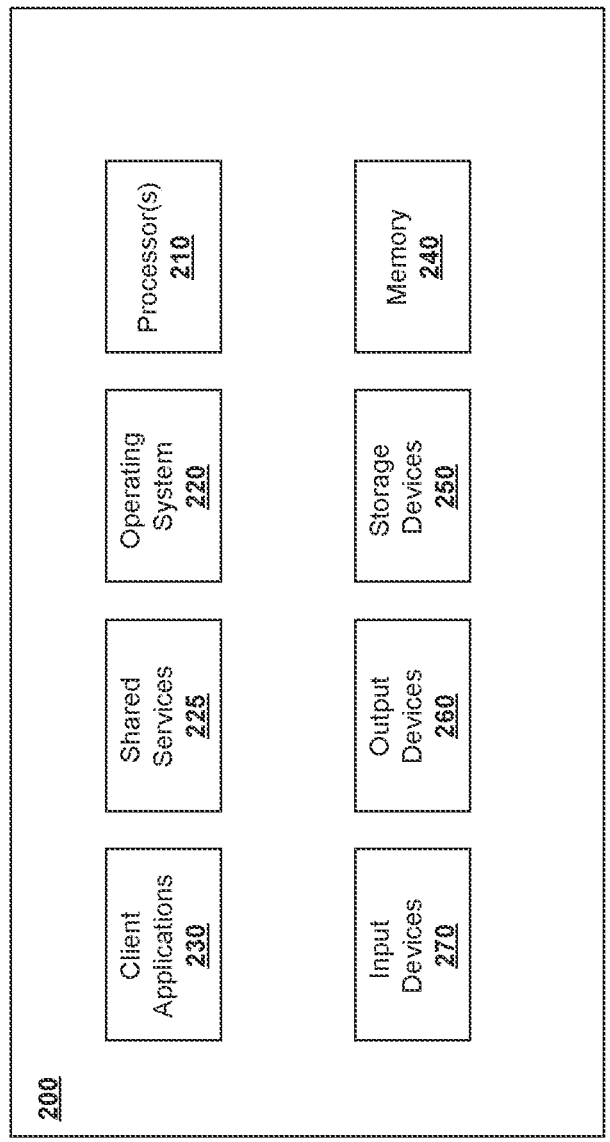
FIG. 2 is a block diagram illustrating an exemplary logical architecture for a subscriber device 513, according to an embodiment of the invention.

In some embodiments, systems according to the present invention may be implemented on a standalone computing system. Referring now to FIG. 2, a block diagram depicting a typical exemplary architecture of one or more embodiments or components thereof on a standalone computing system is shown. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
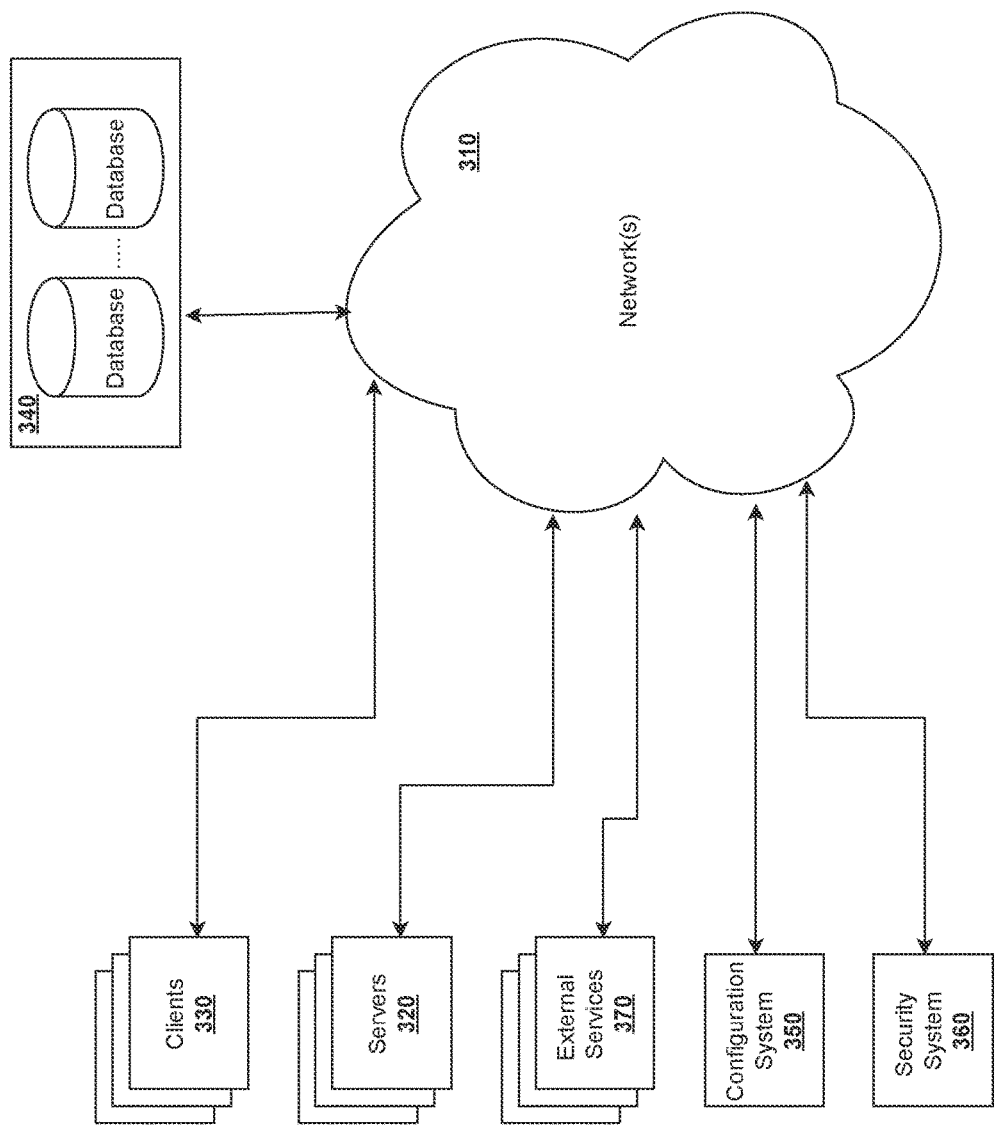
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, a block diagram depicting an exemplary architecture 300 for implementing at least a portion of a system according to an embodiment of the invention on a distributed computing network is shown. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to receive additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may receive information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google Bigtable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
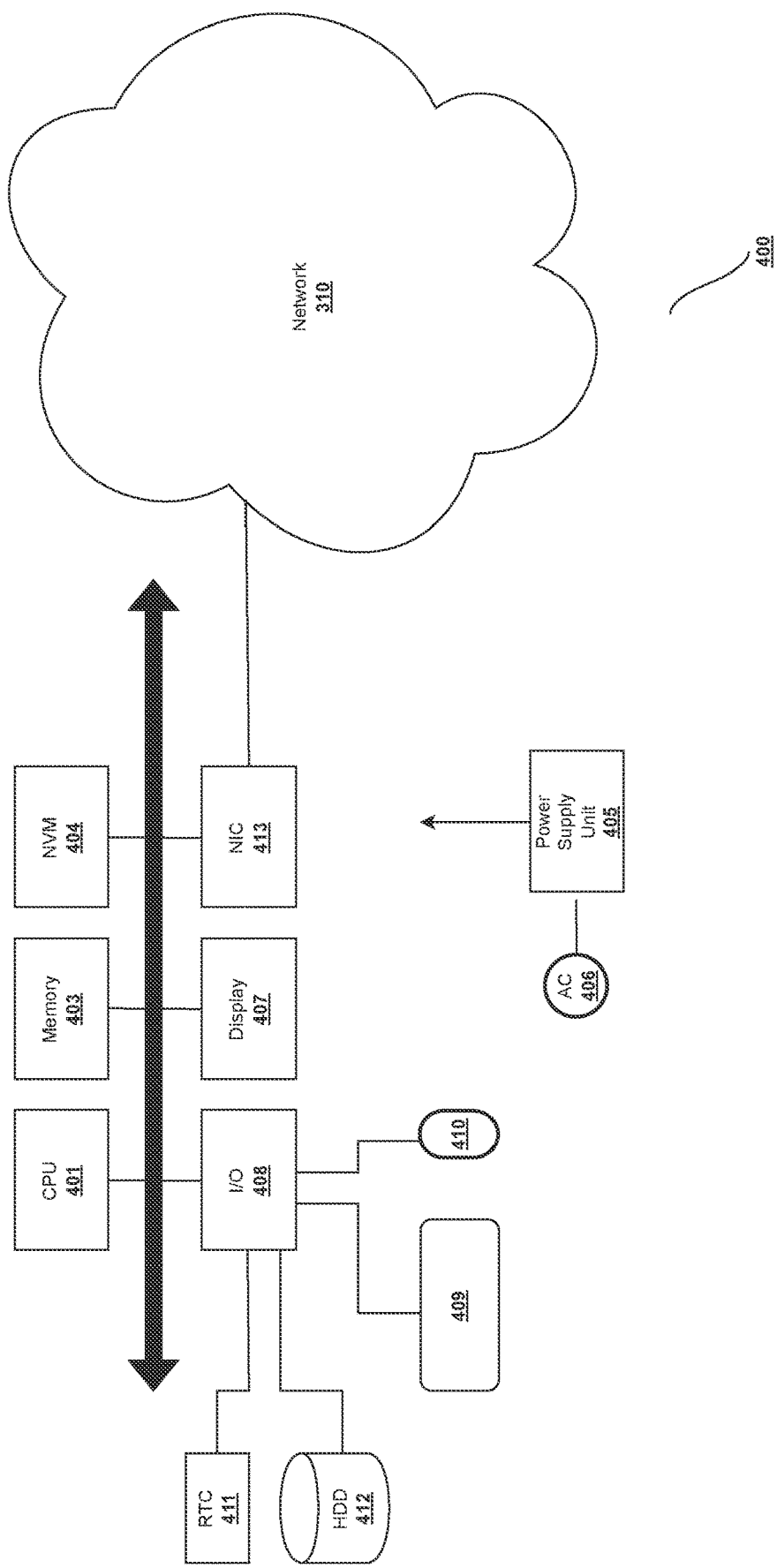
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
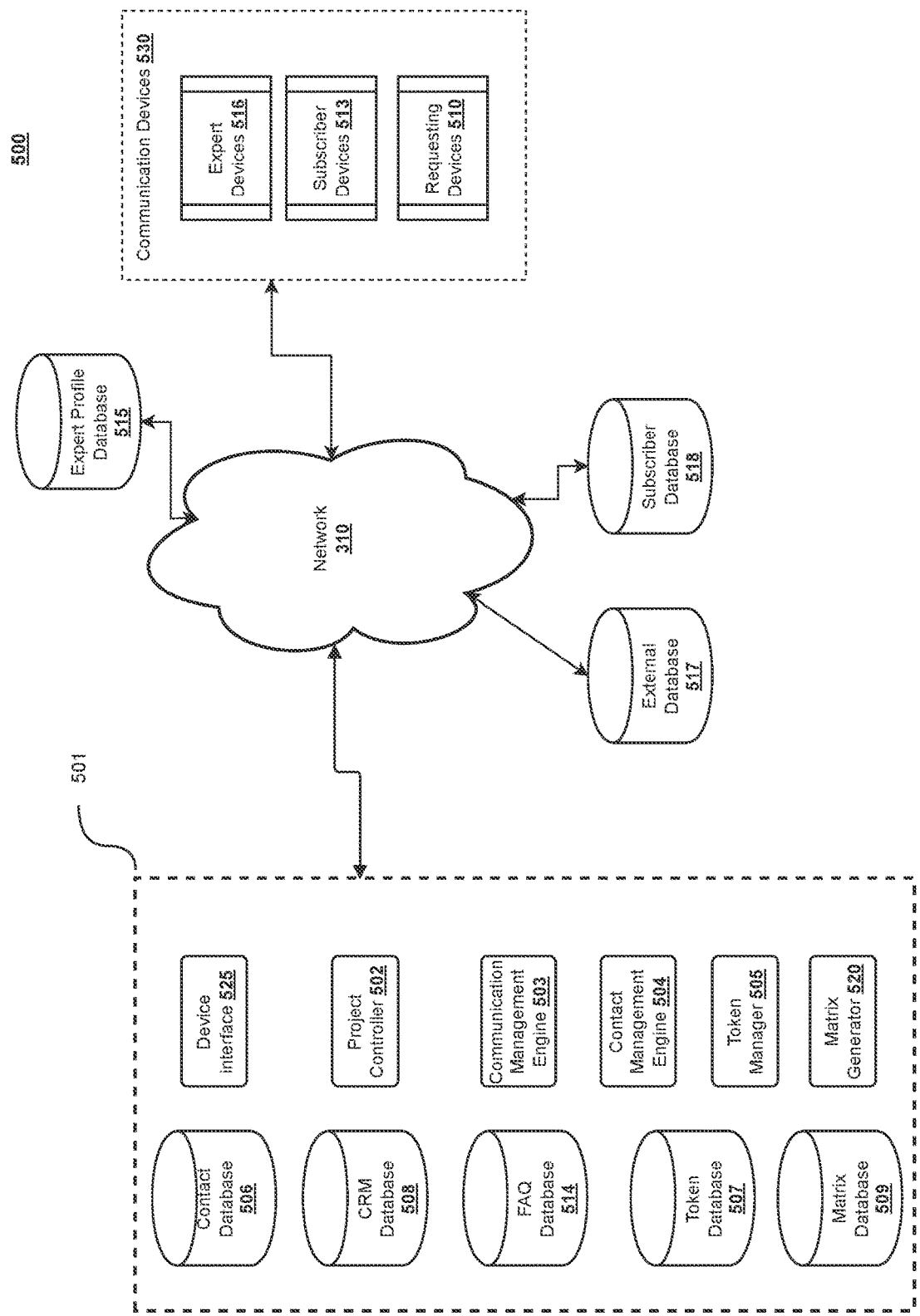
FIG. 5 is a block diagram illustrating an exemplary system architecture, according to a preferred embodiment of the invention.

FIG. 5 is a block diagram of an exemplary system architecture 500 for operating communication control computer 501, according to a preferred embodiment of the invention. According to the embodiment, communication control computer 501, in communication with a plurality of subscriber devices 513, may comprise a plurality of programming instructions stored in a memory and operating on a processor of a network-connected computing device, and may be configured to communicate via network 310 such as the Internet or other data communication network. For example, communication control computer 501 may be configured to communicate via a cloud-based protocol to receive interactions from a plurality of subscriber devices 513, such as to enable one or more users to interact with communication control computer 501 via a web browser, another software application, or a specially programmed user computer. For example, communication control computer 501 may utilize network 310 for creation of a dynamic network pairings (such as that between a subscriber device 513 and one or more requesting devices 510), or to communicate with external databases such as expert profile database 515, subscriber database 518, and the like, via a local network connection such as a LAN operated by a user, or an internal data network operating on subscriber device 513.

In some embodiments, communication control computer 501 may further comprise device interface 525; project controller 502; communication management engine 503; contact management engine 504; token manager 505; and matrix generator 520. Further, communication control computer 501 may comprise of contact database 506; token database 507, CRM database 508, FAQ database 514 and matrix database 509.

In an embodiment, device interface 525 may manage input/output communications to one or more of subscriber devices 513, requesting devices 510, and/or expert devices 516, and in some embodiments, to expert profile database 515, external database 517, and/or subscriber database 518 over network 310.

Further, project controller 502 may create a plurality of network pairings based on one or more communication objects received at least from requesting devices 510. In the embodiment, communication management engine 503 may receive the one or more communication objects from a requesting device 510, each comprising a network pairing request, such as a request to set up a network pairing between the requesting device 510 and a subscriber device 513. The communication objects may be analyzed by project controller 502 to extract data such as context for pairing requests, included question objects and response objects, permission tokens associated with requesting device 510, and the like.

In one embodiment, the extracted data may be further processed by communication management engine 503 to generate dynamic and real-time network pairings between the requesting device 510 and the subscriber device 513, based on factors such as validity of a permission token attached to the communication object, type of request as determined through context, subscriber device 513 preferences, requesting device 510 subscriber access scores (SAS), and the like.

In an embodiment, permission tokens may be created and associated with a given requesting device 510, by project controller 502, such that each permission token may be indicative of whether the given requesting device 510 is allowed to link-up with a subscriber device 513 (for which the permission token is created), for all current and future network pairing requests received from requesting device 510 aimed at the subscriber device 513. The permission tokens may be utilized by communication management engine 503 to authorize new network pairing requests as well as annotate new network pairing requests received from requesting devices 510. The creation of permission tokens for each requesting device 510, whenever permission tokens are not already available, may advantageously enable subscriber device 513 to have complete control over which requesting devices 510 may communicate with them over preferred communication channels at specified times. Further, project controller 502 may also create and revoke the permission token for requesting device 510 based on one or more real-time scenarios, such as a creation or revocation request received from subscriber device 513; unavailability of subscriber device 513 at a time of receiving a network pairing request; and/or comparison of one or more scores calculated for requesting device 510, to predetermined thresholds (as described in detail with regards to FIG. 6).

According to an embodiment, communication control computer 501 may enable preauthorization of communication objects before they are transmitted to subscriber device 513. In the embodiment, contact management engine 503 may scrutinize identification and historic data associated with the requesting devices 510, as received within the communication object, and based on said scrutiny of identification and historic data, communication management engine 503 may generate authorized network pairings to initiate connections between the requesting device 510 and subscriber device 513 (as described in FIGS. 7A-B). In other words, contact management engine 503 may establish a plurality of contact categories, each of which would then be associated with permissions by project controller 502, wherein the permissions may govern the requesting device's 510 ability to connect with the subscriber device 513, depending upon data extracted from the communication object. In another embodiment, communication control computer 501 may request reauthorizations for already transmitted communication objects, from subscriber devices 513. The reauthorization may enable end-user control over created network pairings and any modifications in the reauthorized communication object may be stored by communication control computer 501 in CRM database 508.

In a further embodiment, communication control computer 501 may facilitate for protection of identity of subscriber devices 513 using an array of information, including but not limiting to, permission token status, voiceprint (voice recognition biometrics), location information, context of communication objects, and the like. Systems and methods of the present invention may ensure that subscriber device 513 anonymity and end-user control are enabled using one or more permission tokens that may be generated by communication control computer 501, to allow or revoke communication authorization for any requesting device 510 at any time. This may in turn safeguard end-user control, in that, communication processes and information revealed to the requesting device 510 are performed in such a manner that identity of subscriber device 513 is always hidden from the requesting device 510. Further, permission tokens may be rule-based and may be created or revoked by communication control computer 501, in real-time when a communication object is received from a requesting device 510, based on analysis of subscriber filter criteria for the subscriber device 513 at that given moment. That is, communication control computer 501 may ensure that the network pairing between a requesting device 510 and a subscriber device 513 is created dynamically such that communication control always lies with the subscriber device 513 (as described in FIG. 8).

In a preferred embodiment, communication control computer 501 may provide subscriber devices 513 control over network pairings based on context of the communication object as well as one or more communication channels over which such network pairings may be allowed to be initiated. In an embodiment, wherein the subscriber device 513 is a mobile device in sleep mode or do not disturb mode, communication control computer 501 may allocate different permission tokens to different type of communication objects based on the type of requesting device 510, the owner of the requesting device 510, subscriber device 513 location, current time, and the like. For example, communication control computer 501 may perform location-based analysis of requesting device 510 and subscriber device 513, content and context of the transmitted communication object, subscriber device 513 preferences, etc., and based on such analysis either the communication object may be transmitted to subscriber device 513 or a request decline notification may be transmitted back to requesting device 510.

Figure 6:
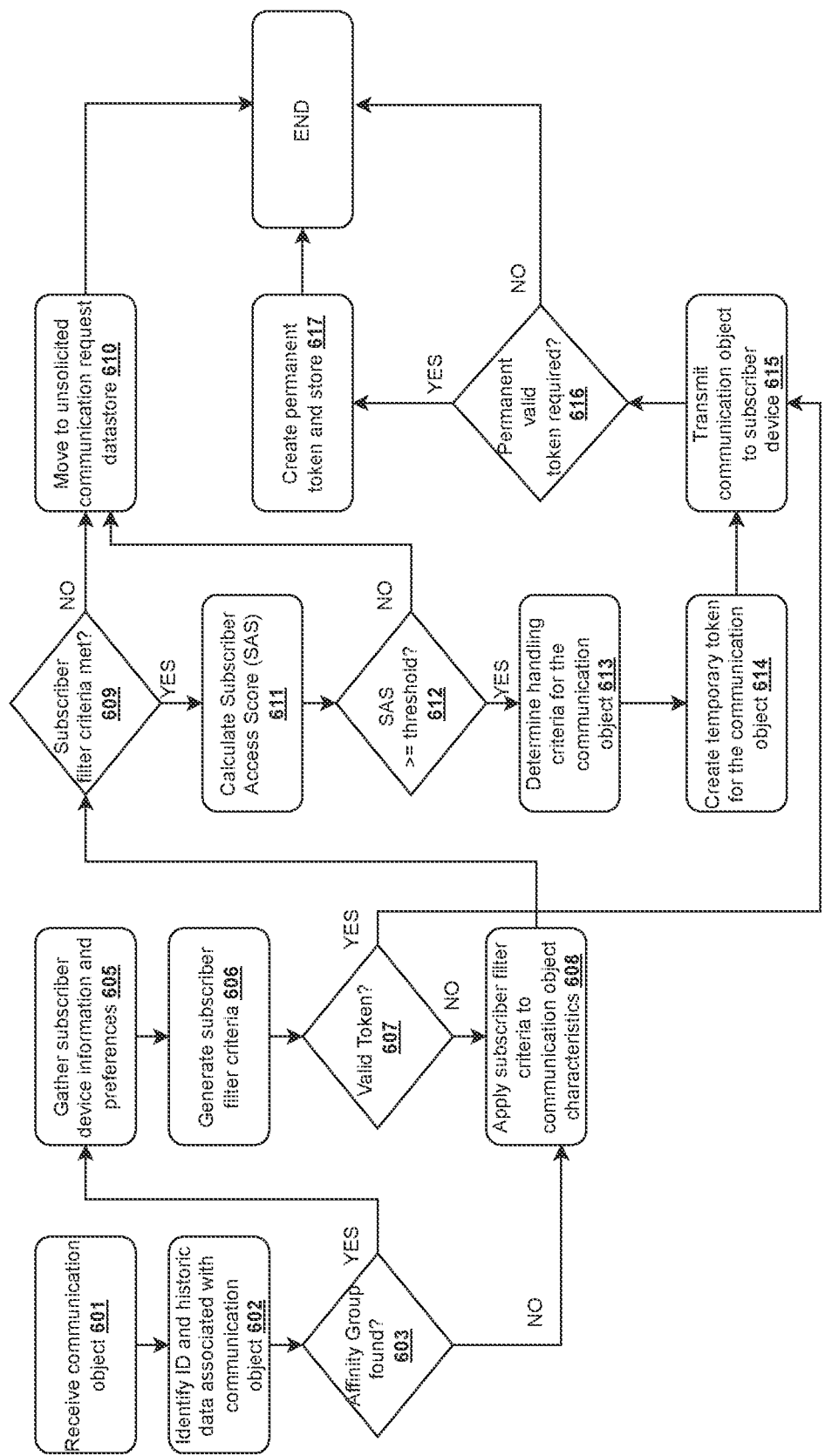
FIG. 6 illustrates an exemplary method for creating a dynamic network pairing between a requesting device and a subscriber device, according to a preferred embodiment of the present invention.

Analysis of the aforementioned dynamic variables, that are continuously changing or unpredictable, may be done by communication control computer 501 using steps described in FIGS. 6, 7A and 7B. Further, a set of priority access permission levels of relationship between subscriber devices 513 and requesting devices 510 may be established by communication control computer 501 for each unique communication object.

According to an embodiment, in an exemplary scenario of dynamic network pairing, communication control computer 501 may receive a communication object comprising one or more question objects, from a subscriber device 513. In the embodiment, communication control computer 501 may provide response objects associated with each question object based on frequently received question objects and corresponding response objects stored within FAQ database 514. However, in case of question objects for which corresponding response objects are unavailable, project controller 502 may first determine context information associated with the question object including, but not limited to, location of the subscriber device 513, contact ID for the subscriber device 513, search history corresponding to the subscriber device 513, and the like stored in contact database 506. Further, based on the determined context, communication control computer 501 may identify a plurality of expert profiles each recognizing an expert device 516 from which response objects may be obtained (as described in FIG. 8).

In an embodiment, communication control computer 501 may match each expert profile against a set of binary qualifying filters generated based on subscriber device 513 preferences and including attributes such as location, demographic information, language, availability, and the like. Once the expert profiles are screened based on the binary filter criteria, by communication control computer 501, one or more expert devices 516 may be disregarded by communication control computer 501. Further, communication control computer 501 may generate Question Attribute Score (QAS) for the question object and Experience Attribute Scores (EAS) for each of the remaining expert devices 516, such that expert profiles may be matched with the question object based on the comparison of QAS and EAS (as described in detail with reference to FIG. 8).

In another embodiment, project controller 502 may further determine whether a communication object received from a requesting device 510 comprises a response object that relates to a previously received question object from a subscriber device 513. In response to a determination that the communication object relates to the previously received question object, project controller 502 may calculate the EAS for the requesting device 510 and the communication object may be transmitted by communications management engine 503 by creating a network pairing between the requesting device 510 and subscriber device 513, when the EAS is greater than or equal to a predetermined threshold (as described in FIG. 9).

In yet another embodiment, matrix generator 520 may generate a relationship matrix between expert devices 516 and subscriber devices 513 at least based on the dynamic network pairings created between different expert devices 516, and subscriber devices 513. Such a relationship matrix, paired with the EAS for the expert devices 516 may govern how a network pairing is created between a given expert device 516 and subscriber device 513 (as described in FIG. 10). Further, the created matrices may be stored within the matrix database 509.

The aforementioned functions of communication control computer 501, along with other preferred embodiments of the present invention, are described in greater detail below, in conjunction with FIGS. 6-10.

Detailed Description of Exemplary Embodiments

FIG. 6 illustrates an exemplary method for creating a dynamic network pairing between a requesting device 510 and a subscriber device 513, according to a preferred embodiment of the present invention.

The method may start at step 601, wherein communication control computer 501 may obtain a communication object from requesting device 510. In an embodiment, the communication object may be obtained when requesting device 510 attempts to communicate with subscriber device 513, using network 310. In the embodiment, project controller 502 may receive the communication object and in a next step 602, project controller 502 may determine identification information and historic stored information associated with the communication object.

The identification information, in an embodiment, may comprise the identification of the requesting device 510, from which the communication object is received, such as caller ID, device type, device location information gleaned from GPS data, device owner information, and the like. Further, historic information may include data pertaining to previous network pairing attempts and associated network pairing attempt outcomes for the requesting device 510. In an example, identification data and historic data may be extracted by project controller 502 from contact database 506. In another embodiment, different types of communication objects may include voice messages, text messages, email messages, video calls, AI-based chat bot sessions, etc.

In a next step 603, project controller 502 may determine, based on the historic information and identification information, whether requesting device 510 is a part of one or more direct or indirect affinity groups corresponding to subscriber device 513. In an embodiment, affinity groups for each subscriber device 513 may be created by communication control computer based on a plurality of communication devices related to a given subscriber device 513 through one or more direct or indirect association means, e.g., communication devices frequently in contact with the subscriber device 513, communication devices explicitly marked as "family devices" for the subscriber device 513, communication devices identified from personal and/or professional devices, social media identities, etc., associated with the subscriber device 513, and the like. In the embodiment, identification of communication devices for a given subscriber device 513 may be performed by communication control computer 501 using analysis of email domains associated with the given subscriber device 513, natural language processing (NLP) analysis of data associated with the given subscriber device 513, and/or extraction of data from datastores (e.g., subscriber database 518) and applications associated with the given subscriber device 513. Further, direct and indirect affinity groups may be created by communication control computer 501 based at least on communication devices that have an indirect association with subscriber device 513, as described in conjunction with FIG. 10.

In a next step 604, in response to a determination by project controller 502 that requesting device 510 does not exist within the affinity group for subscriber device 513, the method may continue to step 608 wherein the communication object may be further evaluated by project controller 502 as comprising an unsolicited network pairing request not connected with an affinity group and without a valid permission token.

Otherwise, in response to a determination by project controller 502 that requesting device exists within the affinity group for subscriber device 513, in a next step 605, communication management engine 503 may gather stored information pertaining to subscriber device 513, including but not limited to subscriber device 513 connection preferences as well as time zone, location, and configuration data associated with subscriber device 513. In an embodiment, communication management engine 503 may extract passive information related to subscriber user device 513, such as connection preferences, from one or more external databases, such as external database 517. Further, communication management engine 503 may determine dynamic information such as location and time zone data, by actively pinging subscriber device 513 in real-time, whenever a network pairing request is obtained from requesting device 510.

Referring again to FIG. 6, in a next step 606, communication management engine 503 may generate subscriber filter criteria for subscriber device 513. In an embodiment, the subscriber filter criteria may be generated by communication management engine 503 in order to determine handling criteria for the communication object, based on the type of communication object received from requesting device 510. For instance, communication control computer 501 may handle each communication object differently based on the type of communication object received. While some of the communication objects may directly be transmitted by communication management engine 503 to subscriber device 513, others may undergo one or more scrutinization steps before such transmission. In several embodiments, subscriber filter criteria may be generated by communication management engine 503 based on type of communication object, day and time of receipt of communication object, affinity group associated with subscriber device 513, current location of subscriber device 513, and the like. For instance, in one embodiment, the subscriber filter criteria may include day and time based filters, e.g., forwarding of communication objects between 11 PM and 7 AM may be disallowed. Similarly, all communication objects may be blocked except for the ones labeled as 'emergency.'

Referring again to FIG. 6, in a next step 607, project controller 502 may determine whether a valid permission token is attached to the communication object obtained from requesting device 510. If it is determined, by project controller 502, that a valid permission token is attached to the communication object, the method may continue to step 615, wherein communication management engine 503 may transmit the communication object to the subscriber device 513. Otherwise, in response to a determination by project controller 502, that a valid permission token is not attached with the communication object, in a next step 608, communication management engine 503 may apply the generated subscriber filter criteria to a plurality of characteristics of the communication object. In an embodiment, the plurality of characteristics of the communication object may include type of communication object, time of obtaining communication object, originating location of the communication object, mode of transmission of the communication object, keywords associated with the communication object, and the like.

In an embodiment, communication management engine 503 may compare the aforementioned filter criteria to the plurality of characteristics of the communication object.

Further, based on the comparison, in a next step 609, communication management engine 503 may determine whether the subscriber filter criteria are met by the communication object. In response to a determination, by communication management engine 503 that the subscriber filter criteria has not been met, in a next step 610, project controller 502 may move the communication object to unsolicited network pairing request datastore or directory (not shown) associated with subscriber device 513, e.g., voicemail, unsolicited email folder, or other automatic disposition that may be internal or external to subscriber device 513.

Otherwise, in a next step 611, project controller 502 may calculate a subscriber access score (SAS) for the requesting device 510 from which the communication object is received. In an embodiment, project controller 502 may determine the SAS based on the following exemplary sequence:

$$SAS = \frac{\text{sum}\{i=1 \text{ to } n\}\{(contactwt(i) * Ncontacts(i) + DurationWt(i) * ContactDuration(i)) * AffinityGroupWt(i)\}}{NF}$$

Wherein NF denotes normalization factor, and contactwt(i) is the weighting given to the number of contacts for the 'ith' affinity group, Ncontacts(i) is the number of contacts within the 'ith' affinity group, DurationWt(i) is the duration weighting for the 'ith' affinity group, ContactDuration(i) is the total duration of the contacts within the 'ith' affinity group, and AffinityGroupWt(i) is the weighting assigned to the 'ith' affinity group.

In a preferred embodiment, the systems and methods disclosed herein may comprise of assigning, by communication control computer 501, each subscriber device 513, e.g., a cellular phone, a designated number and an online messaging address. According to the embodiment, this may mitigate issues surrounding unsolicited attempts to communicate with subscriber device 513 PSTN phone number. This may also be applicable to unsolicited email communications. In one embodiment, communication control computer 501 may associate a system generated phone number and/or messaging address with subscriber device's 513 direct affinity groups as well communication devices associated with affinity groups of those direct affinity groups. Thereby, project controller 502 may generate the SAS for a requesting device 510, when a network pairing request is received.

In an embodiment, the SAS may be calculated for requesting device 510 by project controller 502 based at least on how recent, duration and number of network pairing requests, and/or accumulated time, and the like in both the direct and indirect affinity groups for the targeted subscriber device 513.

Referring again to FIG. 6, In a next step 612, project controller 502 may determine whether the value of SAS for the requesting device 510 is greater than or equal to a predetermined threshold value. In an embodiment, the threshold value may be calculated based on a set of parameters such as time of day, day of week, subscriber device 513 location, subscriber device 513 status, calendar content associated with subscriber device 513, etc. In case of a determination, by project controller 502, that the SAS value for requesting device 510 is not greater than or equal to the predetermined threshold, the method may continue to step 610, wherein communication management engine 503 may move the communication object to an unsolicited network pairing request datastore. Otherwise, in response to a determination by project controller 502 that the value of SAS for requesting device 510 is greater or equal to the predetermined threshold, in a next step 613, communication management engine 503 may determine the handling criteria associated with the communication object. In an embodiment, where the communication object comprises of a voicemail, the handling criteria may include allowing voicemail to be transmitted to subscriber device 513 at a certain time period, holding voicemail transmission to subscriber device 513 till a given time period, moving voicemail to a message queue and/or marked datastore at the subscriber device 513, and the like.

In a preferred embodiment, the threshold value for SAS may be dynamically adjusted by project controller 502 based on continuous feedback learnt by communication control computer 501 through investigating a pattern of responses by subscriber device 513 to a particular type of communication object that was successfully transmitted to subscriber device 513. For example, if subscriber device 513 responds to more than 50% of the communication objects of a particular type, project controller 502 may lower the threshold value a given percentage until the response rate drops below 50%.

Referring again to FIG. 6, in a next step 614, token manager 505 may create a temporary permission token for the communication object received from requesting device 510. In an embodiment, the temporary permission token may be created based on the type of communication object and content contained within the communication object. Further, in another embodiment, the temporary permission token may also be created automatically for communication objects that are either received from a requesting device 510 that has no previous history of network pairing requests with the subscriber device 513 and/or for certain types of communication objects that have not been previously received from a requesting device 510.

In a next step 615, project controller 502 may transmit the communication object to subscriber device 513. In an embodiment, project controller 502 may transmit the communication object to subscriber device 513 along with details of requesting device 510, including but not limited to, device type, voice print (voice recognition biometrics), device location, device owner, device time-zone, and the like. According to the embodiment, token manager 505, in a next step 616, may further send a request to subscriber device 513 to determine whether a permanent permission token should be created for the communication object obtained from the given requesting device 510. In reply to a response from the subscriber device 513, that a permanent permission token be created, token manager 505, in a next step 617, may create the permanent permission token and store the permanent permission token in token database 507. The method may then terminate. In several embodiments, permanent permission tokens may be generated by token manager 505 for a given requesting device 510, only when a response from a subscriber device 513 indicates that the given requesting device 510 is a trusted device for the subscriber device 513, and that future communications may be solicited from requesting device 510 by the subscriber device 513. In some embodiments, with furtherance to creation of the permanent permission token for the given requesting device 510, project controller 502 may also add the requesting device 510 to an affinity group of the subscriber device 513.

Otherwise, in case it is determined by token manager 505, based on the response received from subscriber device 513, that creation of the permanent permission token is not required, the method may end.

FIGS. 7A-B illustrate an exemplary method for processing a communication object for creation of a dynamic network pairing between requesting device 510 and subscriber device 513, according to a preferred embodiment of the present invention.

According to the embodiment, the method may start at step 701, wherein project controller 502 may receive a communication object from a requesting device 510. In the embodiment, the communication object may include one or more of an advertisement object, a connection request object, and the like. In a next step 702, project controller 502 may determine a type of communication object received as well as the type of requesting device 510. For instance, in several embodiments, the type of requesting device 510 may be one of agent device (not shown), expert device 516, or any other electronic device.

In a next step 703, token manager 505 may determine whether a valid permission token is attached to the communication object. In an embodiment, a valid permission token may be attached to a specific communication object, originating from a specific requesting device 510, when the specific requesting device 510 requests a first network pairing from the communication control computer 501. In the embodiment, for each subsequent network pairing request, received from the same specific requesting device 510 for the same type of communication object, token manager 505 may automatically identify the associated permission token. Otherwise, in case of a different communication object type or for communication object types received from a requesting device 510, having no historical data of previous network pairing requests available within the token database 507, the token manager 505 may identify such communication objects as not having any permission tokens attached therewith.

In a preferred embodiment of the invention, the identification of whether relevant permission tokens are associated with each communication object, received from a requesting device 510, may greatly reduce spam network communications being transmitted to subscriber devices 513. Further, such an arrangement using communication control computer 501 protocols, may also provide end-user control to subscriber devices 513, since the entire control of which requesting devices 510 are allowed to communicate with the subscriber devices 513, based at least on the type of communication objects and requesting devices 510, may be solely routed through the network pairings created dynamically by communication management engine 503, each time a network pairing request is received.

Referring again to FIG. 7A, in response to a determination by token manager 505 that a valid permission token is not attached to the communication object, in a next step 706, project controller 502 may determine one or more configuration parameters for the subscriber device 513. In an embodiment, the one or more configuration parameters may include configurations for different types of communication objects. For instance, in some embodiments, communication objects comprising email messages received from requesting devices 510 having SAS above a predetermined threshold value may be routed by communication management engine 503 to a specific directory, e.g., a 'potentially interesting' folder within subscriber device 513 memory. Similarly, for communication objects including a voice call from requesting device 510 having SAS above the predetermined threshold, project controller 502 may perform speech to text and NLP analysis to identify a name of owner of the requesting device 510 as well as designate a purpose of said voice call. Based on such analysis, communication management engine 503 may either save the communication object to a specific directory on the memory of subscriber device 513, e.g., a 'potentially interesting' voicemail folder or forward the communication object to subscriber device 513 for further review. The method may then continue to step 705. In an embodiment, in case it is determined by project controller 502, in step 703, that there are no valid permission tokens available, in a next step 704, project controller 502 may further determine whether the requesting device 510 is authorized. In an embodiment, project controller 502 may determine whether requesting device 510 is authorized by, for example, determining whether a valid permission token is associated with requesting device 510, and/or by using NLP to analyze the communication object content to determine whether requesting device 510 has elicited sufficient known interest to subscriber device 513 to warrant presenting the communication object to subscriber device 513 for review.

In response to a determination by project controller 502 that the requesting device is not authorized, in the step 705, project controller 502 may create a notification object for subscriber device 510, wherein the notification object may be indicative of a lack of authorization of the requesting device 510. Otherwise, in response to a determination that the requesting device 510 is authorized, the method may continue to step 707.

In step 707, communication management engine 503 may forward the communication object to subscriber device 513 based on a type of communication object. In the embodiment, based on a communication object type 510, communication management engine 503 may create dynamic and time bound network pairings between the requesting device 510 and subscriber device 513, preferably only lasting for a cumulative duration of transmission of the communication object from requesting device 510 and receiving a corresponding response object from subscriber device 513.

Referring again to FIG. 7A, in a next step 708, based on analysis of a combination of factors, e.g., state of subscriber device 513, login status of a particular application executing at subscriber device 513, geolocation of subscriber device 513, current day/time of network pairing request, etc., the project controller 502 may determine real-time availability for subscriber device 513.

Further, in a next step 709, communication management engine 503 may request a response object corresponding to the communication object, from subscriber device 513. In an embodiment, response objects may be of different types including, but not limited to, 'Accept', 'Respond', 'Send to Folder by communication object type', 'Reject,' etc. Further, each different response object type may be handled by communication control computer 501 differently, as described in greater detail with reference to FIG. 7B.

In an embodiment, after requesting the response object from subscriber device 513 by communication management engine 503, the method may then continue to FIG. 7B, detailing processing of the response object by communication control computer 501 based on response object type. Finally, in step 711, the response object may be transmitted to requesting device 510.

FIG. 7B illustrates a method for processing one or more types of response objects by communication control computer 501, in accordance with a preferred embodiment of the present invention.

According to the embodiment, the method may continue from step 709 as described above in FIG. 7A. As stated, in step 709, communication management engine 503 may request the response object corresponding to the communication object, from subscriber device 513. For each communication object received with an attached permission token, one or more components of communication control computer 501 may perform steps 712-716. In step 712, project controller 502 may determine whether the communication object is accepted by the subscriber device 513.

In an embodiment, wherein communication control computer 501 runs as an application on subscriber device 513, at the time of downloading and initial registration of subscriber device 513 to communication control computer 501, subscriber device 513 may be provided a plurality of selectable options each indicative of a different manner in which subscriber device 513 may process incoming communication objects, once a dynamic network pairing between the requesting device 510 and subscriber device 513 is created by communication management engine 503. Further, the plurality of selectable options may differ for communication objects having an attached permission token and for communication objects having no permission tokens attached to them. In several embodiments, the plurality of selectable options may comprise choices for subscriber device 513, including but not limited to, create, and send a response object such as: accept the communication object, reject communication object, forward communication object to a particular datastore, defer response object transmission to a predefined time, create a custom response object, select a standard response object, and the like.

Referring again to FIG. 7B, in response to a determination by project controller 502 that the communication object has been rejected by subscriber device 513, in a next step 715, project controller 502 may process communication object as described in the aforementioned, e.g., forward communication object to a dedicated unsolicited network pairing request directory stored in the memory of subscriber device 513 when no valid permission token is associated with the communication object. Otherwise, in a next step 713, project controller 502 may determine a type of response object received from subscriber device 513. Further, in a next step 714, project controller 502 may generate a response object ID for the received response object. In an embodiment, each different type of response object may be associated with a unique response object ID by project controller 502. Further, for every new response object type created by subscriber device 513, that have not been previously recorded by communication control computer 501, project controller 502 may automatically create corresponding response object IDs and store them in contact database 506. In an embodiment, project controller 502 may provide a conversational interactive voice response (IVR) to the requesting device 510 in response to a determination that the communication object comprises a voice interaction. In the embodiment, project controller 502 may capture a dialog as a response to the conversational IVR from the requesting device 510 and convert the received dialog using speech to text to process the dialog using natural language processing (NLP) to determine identification information and context associated with the communication object.

In a next step 716, project controller 502 may create response object content, based at least on the type of response object received from subscriber device 513. In an embodiment, wherein the communication object is a marketing email, and the response object type is "reject," project controller 502 may create a response email stating that the services advertised in the marketing email are not required at this time. Similarly, in another embodiment, wherein the communication object is a message comprising invitation to a certain event and the response object is "accept," project controller 502 may create the response object content as stating, "thank you for the invitation, we will be there." In each of these embodiments, project controller 502 may use various techniques such as context determination, NLP analysis, word profiling, etc. to create automatic response object contents in message or email form as well as in voice form, based on instructions received from subscriber device 513. Once the response object content is created by project controller 502, the method may continue to step 711, wherein the response object may be transmitted to the requesting device 510 by communication management engine 503.

In an embodiment, for each communication object, wherein no permission tokens are attached, one or more components of communication control computer 501 may perform steps 717-725. In step 717, project controller 502 may again determine whether the communication object has been accepted by subscriber device 513. As described in the foregoing, an acceptance or rejection of the communication object by subscriber devices may be identified based on a selection of one of the plurality of selectable options by subscriber device 513. In response to a determination by project controller 502 that the communication object has been rejected by subscriber device 513, in a next step 721, project controller may, forward the communication object to a given external or internal datastore (e.g., unsolicited network pairing request datastore) associated with subscriber device 513, when a valid permission token doesn't exist for the communication object. Otherwise, in a next step 718, token manager 505 may create a permission token for the communication object. Further, in a next step 719, token manager 505 may store the created permission token for the communication object in token database 507.

In a next step 720, project controller 502 may determine the type of response object received from subscriber device 513 corresponding to the communication object. The various types of response objects are as described in the foregoing. Further, in a next step 724, project controller 502 may generate response object ID based on the type of response ID determined. In an embodiment, based on the response object ID, project controller 502 may generate content for the response object. The method may continue to step 711, wherein the response object along with the created content may be transmitted to the requesting device 510 by communication management engine 503.

FIG. 8 illustrates an exemplary method for processing a communication object, comprising at least a question object, for creation of a dynamic network pairing between one or more expert devices 516 and a subscriber device 513, according to a preferred embodiment of the present invention.

According to the embodiment, the method may begin at step 801, wherein project controller 502 may receive a question object from subscriber device. In the embodiment, the question object may comprise of one or more information or data requests from subscriber device 513, including but not limited to, information about specific locations, demographics, subject matter, and any combinations thereof. In a particular embodiment, the question objects may be data requests soliciting information about a given domain being served, e.g., real estate, finance, legal, etc. For instance, the question object may include queries regarding safety and drug usage levels in a given geolocation, scholarship information for universities in a given state, value of real estate in a given time period for a given zip code, or risks associated with government bonds, municipal bonds, or commercial bonds compared to index stocks, and the like. A person skilled in the art would appreciate that the above scenarios are exemplary, and many other data or information requests may be comprised within the question object.

Referring again to FIG. 8, in a next step 802, project controller 502 may determine a context of the question object. In an embodiment, project controller 502 may determine the context of the question object by analyzing information about an owner of subscriber device 513 and previous interactions of subscriber device 513 with communication control computer 501. In an embodiment, information about an owner of subscriber device 513 may include demographic information such as, e.g., marital status, family information, geolocation, annual income, and the like. Further, previous interactions of subscriber device 513 with communication control computer 501 may include question objects previously received from subscriber device 513 soliciting information on, e.g., school districts, real estate, and the like for a desired zip code or geolocation.

In a next step 803, project controller 502 may determine whether the question object is received in an audio or audio-video form. In an embodiment, communication control computer 501 may be configured to process communication objects from subscriber device 513, expert device 516, and/or requesting device 510, in one or more media types, including but not limiting to, voice, text, multimedia message, audio-video, or a combination thereof. In response to a determination by project controller 502 that the question object is not received in an audio or audio-video type, the method may continue to step 805. Otherwise, in a next step 804, project controller 502 may initiate a speech to text conversion process for the question object. Once the question object content is converted to text by project controller 502, in a next step 805, project controller 502 may perform natural language processing (NLP) on the question object content text by analyzing the question object against data from one or more previously received question objects and corresponding response objects stored in, e.g., FAQ database 514 as well as correlated information stored in, e.g., subscriber database 518 that may be related to the previously received question objects and corresponding response objects, given a context of the current question object.

In a next step 806, project controller 502 may determine whether a corresponding answer object is available for the received question object. In an embodiment, project controller 502 may query the FAQ database 514 to determine whether there are one or more answer objects that correspond to the received question object. In the embodiment, the identification of corresponding response objects may be done based at least on previously received question objects and their respective answer object pairings stored by communication control computer 501 in FAQ database 514. For instance, communication control computer 501 may map one or more answer object to each question object received, once said one or more answer objects are transmitted to subscriber devices 513. Such mappings may then be stored in FAQ database 514 and queried each time a communication object comprising a question object is received from subscriber device 513 (or in some embodiments from requesting device 510).

In response to a determination by project controller 502 that a corresponding answer object for the question object is available, in a next step 818, project controller 502 may present the answer object to subscriber device 513. The method may then continue to step 801, wherein another question object may be received by project controller 502 from subscriber device 513. Otherwise, in response to a determination by project controller 502 that no corresponding answer object is available, in a next step 807, project controller 502 may further determine whether binary filter criteria for subscriber device 513 is available.

In an embodiment, the binary filter criteria for a given subscriber device 513 may be indicative of one or more criteria that may govern the type of response object that may be required by subscriber device 513 for any question object received by communication control computer 501. In one embodiment, wherein the question object relates to requisition of information on real estate, the binary filter criteria for subscriber device 513 may include geographical location, demographic information for expert profiles, translation requirements, subject matter expertise requirements, and the like. In response to a determination by project controller 502 that the binary filter criteria are unavailable, in a next step 808, project controller 502 may create the binary filter criteria for the subscriber device 513. In an embodiment, the binary filter criteria for subscriber device 513 may be created by project controller 502, at least based on preference information received from subscriber device 513 at the time of initial registration of subscriber device 513 with communication control computer 501.

Otherwise, in response to a determination by project controller 502 that binary filter criteria for subscriber device 513 is available, in a next step 809, project controller 502 may create a plurality of expert profiles, each identifying an expert device 516, based at least on the binary filter criteria and a determined context of the question object. In an embodiment, the context of the question object may be determined by project controller 502 as described in the foregoing. In the embodiment, based on the determined context, project controller 502 may identify the plurality of expert profiles best suited to provide a corresponding answer object for the question object obtained from subscriber device 513. For instance, in an embodiment wherein the question object pertains to real estate queries, project controller 502 may query matrix database 509 and/or external database 517 to identify the plurality of expert profiles that are associated to expert real estate agents, market experts, and real estate businesses based on subscriber device 513 preferences. In one embodiment, matrix database 509 may have stored therein expert profiles previously identified by communication control computer 501. These expert profiles, in several embodiments, may have been identified based on creation of one or more relationship matrices comprising multiple expert devices 516 each corresponding to a specific expert profile and connected to one another in a hierarchal manner. Such a relationship matrix is further disclosed with reference to FIG. 10. Further, each relationship matrix may be dynamically updated based on opportunity scores associated with each expert device 516 as calculated and modified by communication control computer 501 (described in detail with reference to FIG. 10).

Referring again to FIG. 8, in a next step 810, project controller 502 may generate a standardized question object and associated context for the question object. In an embodiment, project controller 502 may perform NLP to determine a particular context for the question object based at least on the available response objects stored, e.g., in FAQ database 514, under a given domain. For example, one or more available response objects may be labeled under domains including, but not limiting to, 'home,' 'finance,' 'school,' and the like. Further, in a preferred embodiment, project controller 502 may determine the context for the question object regardless of a plurality of specific words included within the question object received from subscriber device 513. Thus, project controller 502 may preferably create a standardized format for the question object and match the standardized question object with its associated context. For instance, in an embodiment wherein the question object content comprises of a request for data on a specific tourist location, the standardized question object may be created such that it is indicative of type of information (general information), specialization (tourism), expertise level (beginner, intermediate, or advanced), previously requested (yes or no), etc. for the question object. Further, project controller 502 may associate the standardized question object with the determined context, to create a mapping and store the same in FAQ database 514. Such a pairing may enable communication control computer 501 to dynamically identify a context and standardization for future question objects substantially similar to the question object being currently processed. In an embodiment, the mapping of standardized question object and context may include "tourism—general," "real estate—school district," "healthcare—drug intake," and the like.

Referring back to FIG. 8, in a next step 811, project controller 502 may create a plurality of scoring attributes for the question object. In an embodiment wherein the question object pertains to real estate market, the scoring attributes for the question object may include factors such as local market expertise for a certain zip code, price range, quality of real estate, safety data, and the like. In the embodiment, each scoring attribute may be assigned a number from 1 to n, such that there may be a total of n scoring attributes, wherein n may be any predetermined number. In a next step 812, project controller 502 may determine a question attribute score (QAS) for the question object. In an embodiment, project controller 502 may calculate the QAS based on the following exemplary sequence:

$$QAS = (Sum(1-m):(QuestionAttributeWeight(i)*QuestionAttributeScore(i)))$$

wherein, QuestionAttributeWeight may be a predetermined value assigned to a given attribute of the question object; and QuestionAttributeScore may be a score of each such attribute.

In an embodiment, when the question object is related to 'real estate,' attributes may include published statistics, e.g., median home price, population, as well as researchable information, e.g., number of students accepted by universities, local knowledge, e.g., running trails, places for food supplies, veterinarian services, and the like.

Further, in a next step 813, project controller 502 may calculate an expert attribute score (EAS) for each expert device 516 associated with the plurality of expert profiles. In an embodiment, the EAS for an expert device 516 may be indicative of a quantified likelihood of the expert device 516 of possessing a response object tailored to the question object and may be calculated by project controller 502 using the following exemplary sequence:

$$EAS = \{(Sum(1-n):(ExperienceWeight(i)*ExperienceAttribute(j)))\}$$

wherein, ExperienceWeight may be a predetermined value assigned to a given attribute corresponding to an expert device 516; and ExperienceAttribute may be a score of each such attribute.

In an embodiment, experience attributes may include years of experience, certifications, years in the community, annual volume of sales, average price range of properties handled, membership in one or more affinity groups associated with subscriber device 513, and the like for a given expert device 516.

In another embodiment, for each of a K qualified expert profiles an expert score (ES) may be calculated by project controller 502 based on the following exemplary sequence:

$$ES = \frac{QAS + EAS}{NormalizationFactor}$$

According to the embodiment, ES may result in a set of K normalized expert profiles that may be ranked by project controller 502, e.g., in an ascending order. The highest score may represent expert profiles having the highest quantified probability of having a response object corresponding to the question object, having met the binary filter criteria of subscriber device 513.

In a next step 814, project controller 502 may match the obtained question object with selected top n expert profiles from the plurality of expert profiles. In one embodiment, the top n expert profiles may be selected based on their respective EAS, and the question object may be matched to each individual expert profile of the top n expert profiles. In the embodiment, such a match may enable communication control computer 501 to associate expert profiles, already stored within, e.g., CRM database 508, or extracted from one or more external databases to the question object, such that a targeted database of question objects and associated experts may be created within the communication control computer 501 for each such request from subscriber device 513. Further, such a matching of expert profiles with question objects by communication control computer 501 may allow for easy and directed recognition of expert devices

516, such that dynamic network pairings between such expert devices 516 and subscriber device 513 may be automatically created by communication management engine 503, without the need of a user to manually search for professionals within their contacts and/or on the world wide web, for one or more of their requirements. This may further advantageously provide the user complete control over their device privacy and ensure anonymity, since there may be no requirements for the user to share their personal information at any step of the method.

Referring again to FIG. 8, in a next step 815, communication management engine 503 may transmit the top n expert profiles to subscriber device 513 for display. In an embodiment, the top n expert profiles may be transmitted along with information including but not limited to expert name, location, age, gender, language expertise, subject matter expertise, and any combinations thereof. Further, in a next step 816, project controller 502 may receive a selection of one of the top n expert profiles from subscriber device 513.

In a next step 817, project controller 502 may determine whether an appointment with expert device 516 associated with the selected expert profile is available. In an embodiment, project controller 502 may determine availability of the expert device 516 by querying a calendar application of the expert device 516 that is associated with the selected expert profile. In the embodiment, project controller 502 may compare entries in the calendar application of the expert device 513 to one or more entries in a calendar application associated with subscriber device 513. In another embodiment, project controller 502 may also send a notification object to subscriber device querying for one or more available time spans in which the subscriber device 513 is available. Once an available appointment is identified project controller 502 may communicate the availability to subscriber device 513 and, in a next step 818, receive confirmation from subscriber device 513. Based on the received confirmation, in a next step 819, project controller 502 may create an appointment schedule and transmit said appointment schedule to both subscriber device 513 and expert device 516. In case a confirmation from subscriber device 513 is not received by project controller 502, one or more alternative appointment schedules may be transmitted to subscriber device 513 by project controller 502.

In some embodiments, once project controller 502 receives confirmation from subscriber device 513 regarding an appointment schedule with expert device 516, communication management engine 503 may create a network pairing between subscriber device 513 and expert device 516 for the time period of the appointment, by methods as described in FIG. 6. In the embodiment, the initial network pairing may be created by communication management engine 503 by creation of a temporary permission token for the expert device 516. Further, once the communication between subscriber device 513 and expert device 516 terminates, communication management engine 503 may query subscriber device 513 regarding creation of a permanent permission token for said expert device 516. Based on a response from subscriber device 513, token manager 505 may then create the permanent permission token for the expert device 516 and store the permission token in the token database 507.

FIG. 9 illustrates another exemplary method for processing a communication object for creation of a dynamic network pairing between one or more expert devices 516 and a subscriber device 513, according to a preferred embodiment of the present invention.

According to the embodiment, the method may begin at step 901, wherein project controller 502 may receive a communication object from a requesting device 510. In an embodiment, the communication object may comprise a question object, a response object, etc., as described in the foregoing, and may be sent by requesting device 510 to create a network pairing with a subscriber device 513.

In a next step 902, token manager 505 may determine whether a valid permission token is associated with the communication object. Token manager 505, in one embodiment, may determine association of a valid permission token with the communication object, by querying the token database 507 for previously stored permission tokens that were linked to the specific communication object type of the received communication object by token manager 505, for the given requesting device 510.

In case it is determined by token manager 505 that a valid permission token is associated with the communication object, the method may continue to step 906. Otherwise, in a next step 903, project controller 502 may apply subscriber filter criteria, associated with the subscriber device 513, to one or more characteristics of the communication object. In an embodiment, the one or more characteristics of the communication object may include type of communication object, time of obtaining communication object, originating location of the communication object, mode of transmission of the communication object, keywords associated with the communication object, and the like.

In a next step 904, project controller 502 may determine whether the subscriber filter criteria for the subscriber device 513 is met by the communication object. In response to a determination by project controller 502 that the subscriber filter criteria is not met, in a next step 905, the communication object may be moved by project controller 502 to an unsolicited network pairing request folder, since a valid permission token doesn't exist for the communication object. In an embodiment, wherein communication object includes a voice call, email, or text message, project controller 502 may send rejected voice calls to an unsolicited voicemail folder, rejected emails to an unsolicited email folder, or rejected text messages to an unsolicited text folder.

Otherwise, in step 906, project controller 502 may calculate a subscriber access score (SAS) for the subscriber device 513. In an embodiment, project controller 502 may calculate the SAS for the subscriber device 513, as described above with reference to FIG. 6. Further, in a next step 907, project controller 502 may determine whether the calculated value of SAS is greater than or equal to a predetermined threshold value. In response to a determination by project controller 502 that the value of SAS is not greater than equal to the predetermined threshold value, the method may continue to step 905.

Otherwise, in a next step 908, project controller 502 may determine a type of communication object. In an embodiment, project controller 502 may determine whether the communication object comprises a message object, a response object, a question object, a marketing email, or any combination thereof. Based on the determination of the communication object type, in a next step 909, project controller may determine whether the received communication object relates to a question object previously received from the subscriber device 513. In an embodiment, such a determination may be made by project controller 502 as described with respect to steps 609 and 611 in FIG. 6, i.e., by analyzing contents of the communication object against previously received question objects the subscriber device 513, e.g., during time-period N, wherein N may be a given number of months or years. In an embodiment, such an analysis may result in a weighted score quantifying a probability of the communication object to be related to a previous question object received from the subscriber device 513. In another embodiment, the weighted score is included in the SAS.

In response to a determination by project controller 502 that the communication object does not relate to a previously received question object, the method may continue to step 913. Otherwise, in a next step 910, project controller may calculate the QAS for the previously received question object. In an embodiment, project controller 502, may calculate the QAS for the question object as detailed in FIG. 8.

Further, in a next step 911, project controller 502 may calculate the EAS for the requesting device 510. In an embodiment, project controller 502, may calculate the EAS for the requesting device 510 as detailed in FIG. 8. In a next step 912, project controller 502 may determine whether the EAS is greater than equal to a predetermined threshold. In response to a determination, by project controller 502, that the EAS is greater than or equal to the predetermined threshold, in step 913, communication management engine 503 may transmit the communication object to the subscriber device 513. In several embodiments, the communication object may be transmitted to the subscriber device by communication management engine 503 by creating a dynamic network pairing between the requesting device 510 and subscriber device 513, as detailed in FIGS. 6 and 7.

However, in response to a determination, by project controller 502, that the EAS is not greater than or equal to the predetermined threshold, in a next step 914, project controller 502 may present an option to the subscriber device 513 to schedule an appointment with the requesting device 510. In an embodiment, presentation of the option for scheduling an appointment by project controller 502 to the subscriber device 513, may preferably provide the subscriber device 513 control over communication with the requesting device 510, even when the EAS for the requesting device 510 does not meet the predetermined threshold for EAS. In an embodiment, wherein the communication object from the requesting device 510 does relate to the question object previously received from the subscriber device 513, the subscriber device 513 may still be provided with an option to request a network pairing with the requesting device 510, even when the EAS for the requesting device 510 fails to meet the threshold. Such an arrangement may offer the subscriber device 513 ultimate end-user control over whether a network pairing is sought with the requesting device 510 or not.

Referring back to FIG. 9, in a next step 915, project controller 502 may determine whether an appointment confirmation is received from the subscriber device 513, for the requesting device 510. In response to a determination, by project controller 502, that such an appointment confirmation is received from subscriber device 513, in a next step 916, project controller 502 may create the appointment schedule between the subscriber device 513 and requesting device 510. Further, project controller 502 may transmit the created appointment schedule to the subscriber device 513 as well as the requesting device 510. In some embodiments, once project controller 502 receives confirmation from subscriber device 513 regarding an appointment schedule with expert device 516, communication management engine 503 may create a network pairing between subscriber device 513 and expert device 516 for the time period of the appointment, by methods as described in FIG. 6. In other embodiments, project controller 502 may also include the subscriber device 513 to the relationship matrix constructed by matrix generator 520 for the requesting device 510 (as described in FIG. 10).

FIG. 10 illustrates a block diagram for a relationship matrix construction comprising subscriber devices 513 and expert devices 516, according to a preferred embodiment of the invention. According to the embodiment, FIG. 10 depicts a construction of a relationship matrix by communication control computer 501 forming, for example, a hierarchical tree-like structure in which expert devices 516 are top-level nodes (referenced by numeral 1201), followed by direct subscriber device 513 (referenced by numeral 1202) nodes followed by one or more indirect subscriber device 513 nodes (referenced by numerals 1203-1206).

A top-level node of a plurality of top-level nodes, may be generated by matrix generator 520 in step 1001 by assigning a unique ID and tagging them with a unique ID (for example, an "R") indicating they are at the top-level. In this case, 1201 is the unique ID of this top-level node in the matrix.

A direct level node may be generated by matrix generator 520 in step 1002 and assigned a unique ID (for example, a "D") indicating it is a direct level node. A link may be then placed in the direct node indicating that its parent is a top-level node 1201. In this case, 1202 is a direct node in the matrix.

Two Indirect nodes may be generated by matrix generator 520 in step 1003 and assigned numerals 1203 and 1204 and tagged with a unique ID (for example, an "I") indicating an indirect node. A link may then be placed in each indirect node indicating that its parent is direct node 1202.

This may indicate two direct nodes being added to the top-level node. They may be generated by matrix generator 520 in step 1004 and assigned 1205 and 1206 and tagged with a unique ID (for example, "D") indicating they are direct nodes in the matrix. A link may be placed in each direct node to indicate that its parent is the top-level node 1201.

In some embodiments, the above process may be repeated in the course of constructing the matrix such that a plurality of nodes will be configured in the matrix. In some embodiments, once the matrix nodes are constructed and linked, their relationship are read-only and may not be destroyed.

Accordingly, the outlined systems and methods disclosed herein will offer significant improvements for location-based services with local expert devices 516 associated to a specific geolocation are communicatively connected to provide services to subscriber devices 513. For example, organization in a specific location may want interactions to be routed to and handled by expert devices 516 in that location.

Embodiments of the present invention disclose systems and methods for providing expert device 516 designation and dynamic network pairings with one or more subscriber devices 513. The systems and methods provide for computed designation and network pairing of one or more subscriber devices 516 to one or more expert devices 516 with device ancestry based on a type of communication object and requirement involved in the transaction and/or preferences of the one or more subscriber devices 513.

First, a pool of expert devices 516 that are in the common areas may be identified. A designation and routing algorithm may match up the one or more expert devices 516 that match the one or more subscriber device 513 preferences and remote expert device 516 with attribute preferences. The matching attributes may include, but not limited to, a baseline attributes of quality (cumulative usage), quantity (cumulative number of registrations) location, and the like.

In some embodiments a plurality of eligible expert devices 516 may be identified. The plurality of eligible expert devices 516 may be determined by project controller 502 by computing a match between the subscriber device 513 requirements and credentials associated to one or more expert device 516. Another important aspect is a simultaneously gathering of data and browsing activity associated with the ancestry in the lineage of the devices in the matrix. Devices may be scored simultaneously and dynamically.

When the matrix is formed, a minimum number of devices may be isolated (for example, three devices are isolated). For example, (i) an originating or referring device (e.g., an expert device 516), (ii) a subscriber device 513 and (iii) a remote device (subscriber device 513 or expert device 516). In some embodiments, many devices may be included in the ancestry of devices in the relationship matrix.

Although numerous algorithms are possible, in a preferred embodiment, a method by which subscriber device 513 preferences (for example, initially set up in the initial registration) match one or more expert device 516 abilities and skill sets. A major emphasis of the scoring may be focused, for example, on rewarding expert devices 516 associated with a best network outside of their configured location.

A method of scoring devices in a relationship matrix may also include tracking of data in a lineage and hierarchy of devices of each subscriber device 513 in the matrix. When a relationship matrix is formed, a snapshot of data and browsing activities associated with a plurality of devices in the ancestry and hierarchy of all linked devices may be stored in matrix database 509. The relationship matrix may be formed or completed when activity or a request is received from a subscriber device 513. Simultaneously, at least a portion of browsing data and/or user data may be collected throughout an entire ancestry of devices that make up the relationship matrix.

Device types to score may include:
- Score registered users via a native mobile app or AI embedded app
- Score registered users via a unique website URL associated
- Score registered users via a URL associated with an AI chatbot
- Score registered users using a voice activated communication end point (for example, Amazon™ Alexa™)
- Score registered user using a computing device
- Score registered users using an electronic assistant application and/or device (for example, Google™ Personal Assistant)
- Devices may include entry via a native app, a blog post, a website, or any place a user may register. Devices may be scored regardless of its point of entry.

When action is received by a subscriber device 513, methods described herein may be selected depending on an act by the subscriber device 513. Further, a relationship may be formed and complete identities of all the devices may be established. A snapshot of browsing activity may take place and then the subscriber device 513 may be communicably enabled.

In some embodiments, building, forming, and completing a relationship matrix may comprise a plurality of steps, for example:

A matrix may be built, by matrix generator 520, comprising a multi-level organizational structure. Capturing and registering a device, may function with a multilevel organizational structure. A multi-level structure comprising a relationship matrix may be built, by matrix generator, and accommodate:
- A first expert device 516 may designate an unlimited number of associated other expert devices 516;
- An expert device 516 may sponsor a first subscriber device 513 (for example, a direct subscriber device 513 associated to the expert device 516);
- A first subscriber device 513, of a plurality of subscriber devices 513, may sponsor others subscriber device 513 (for example, and indirect subscriber device 513 associated to the subscriber device 513); and/or
- A second subscriber device 513 (for example, and indirect subscriber device 513), of the plurality of subscriber devices 513, associated to the expert device 516 may sponsor other subscriber devices 513 (for example, and indirect subscriber device 513 associated to expert device 516).

Action received from subscriber device 513 may be displayed in a display device, or displayed via a template on an AI chatbot or by instruction (for example, by voice instruction) by subscriber device 513, as selected by the subscriber device 513, but not limited to, the following types of acts: a voice call, text message, chat session, ask the expert, email message, meeting request, acceptance via an electronic calendar, impromptu and immediate meeting request, such as the a schedule request, or vis' a vis' a chat box experience—data may be integrated with chatbot. Further, in some embodiments, a closing message from chatbot may display a template of several options, such as (i) a request to establish communication, (ii) type of communication, (iii) need to set up a calendar event, and the like. Subscriber device 513 may be an orphan and has gotten an invite to the system via a social media post or from directly loaded from an app store (Apple™, Android™) associated to subscriber device 513.

Devices may be scored, by one or more scorers comprised in project controller 502 and methods described herein may be employed and applied and may be dependent on the action received from the subscriber device 513.

One or methods described herein may be executed for different actions received from subscriber device 513 depending on an action received from subscriber device 513 comprising any matching preference requirements or matches between the plurality of subscriber devices 513, subscriber device 513 and/or expert device 516. In some embodiments, methods executed may be based on, for example, an amount of time a specific piece of information was reviewed by a subscriber device 513. In this regard, a usage variable may be broken down from total usage to usage reviewing properties.

Assignment of device or devices: Systems described herein may communicably couple a subscriber device 513 to an action received from an expert device 516 and ultimately to the device or devices. In the case of a question object received from the subscriber device 513, a plurality of expert devices 516 may be selected by matrix generator 520. In some embodiments, methods described herein may be executed to provide, for example, a first expert device 516, 70% of interactions, a second expert device 516, 20%, and 10% on a third device expert device 516, and so on.

In some embodiments, there may be a plurality of relationship matrices formed between a subscriber device 513 and a plurality of expert devices 516. For certain requests, where computer 501 may select, for example, three expert devices 516; there may be, for example, three simultaneously created relationship matrices.

In some embodiments, a subscriber device 513 may primarily determine an event and a time that a relationship matrix may be formed by matrix generator 520. In some embodiments, scoring of devices may be based on a subscriber device 513 request and the relationship matrix may be completed, by matrix generator 520, after or simultaneously while devices have been communicably connected.

Parameters considered by methods described herein may include, but not limited to, voice recognition biometrics, time of day, time, location, a location-based geographic distance between devices, number of devices registered and cumulative interaction time in each device. Each of these variables may increase or decrease dynamically and/or simultaneously. These activities all occur dynamically either larger or smaller and simultaneously. And each of the relationship matrix(s) may be formed dynamically and/or simultaneously. In some embodiments, a use of presence management, by presence manager, may be implemented.

Methods described herein may utilize a plurality of dynamic attributes such as quality (cumulative usages of registered subscriber devices 513), quantities (number of registered subscriber devices 513 each expert device 516 may have registered), location, and the like.

In some embodiments, for example, if a certain type of request (for example, question object) is received from a subscriber device 513 is, then methods described herein may also factor in credentials and years of experience associated to the expert device 516 owner.

In some embodiments, if a certain type of request is received (for example, for a scheduling event), then methods described herein may factor in a proximity of devices closest to the subscriber device 513 (for example, based on location information received from the device) as well as presence management. For example, see impromptu appointment below.

In some embodiment, if a request to establish a communication with another device based on skill (for example, language) is received from subscriber device 513, then the processor may include a language variable. See method for language preference below.

In some embodiments, matrix generator may capture, track and extract data points and browsing history associated with a lineage of each subscriber device 513 comprised within the matrix; from the referring device (its origin including location, product and browsing history, etc.).

Methods described herein may be used for a plurality of devices associated to clients and agents in a referral network, for example, a real estate vertical.

In some embodiments, a number of registrations and other data may be received from one or more subscriber devices 513 who may be in a similar geographic location as an expert device 516. An amount of interaction time may be recorded, by project controller 502, that tracks whether the interaction is from an (ancestral lineage) direct or indirect subscriber device, or other device with respect to device 513 of the user.

A value of the relationship matrix formed based on interactions may be that a regional or national organization may instantly obtain a common ancestry of at least a portion of devices in an associated relationship matrix (comprising expert devices 516 and subscriber devices 513).

In some embodiments, key devices in a relationship matrix may include an originating or referring device, one or more subscriber devices 513 (direct and indirect), and an expert device 516.

Devices that may be scored, by project controller 502, in a relationship matrix may comprise user devices and subscriber devices 513.

In some embodiments, project controller 502 may score a device based on a score associated to user devices in a relationship matrix and may be used to identify devices who are designated as most qualified to answer questions originating from a subscriber device 513.

An objective of project controller 502 may be to score devices to complete a relationship matrix in a referral network environment. Accordingly, devices may be scored to isolate a device with a high number of successful interactions, or transactions, or are associated to a particular skill set. For example, in a referral network (or a relationship matrix), a completion or formation of a relationship matrix may be desired. In some embodiments, a completion of a relationship matrix may be formed between devices when action is received from subscriber device in order to automatically create a set of affinity groups 513.

The following may be events that may cause a subscriber device 513 to act; thus, requiring the scoring of devices previously to assigning a transaction. For example:

A request is received, at communication management engine 503, from a subscriber device 513 requesting a voice communication with an expert device 516;

A request is received, at communication management engine 503, from a subscriber device 513 requesting a chat session with an expert device 516;

When a request is received, at communication management engine 503, from a subscriber device 513, for example, an "ask the expert" comprised within an email message;

When a calendar request is received, at communication management engine 503, from a subscriber device 513, at communication management engine 503 may automatically calendar an appointment;

When a request is received, at communication management engine 503, from subscriber device 513 requesting to establish an electronic communication;

An interaction is received, at communication management engine 503, from an AI-based chatbot session.

In a preferred embodiment, multiple simultaneously created relationship matrices may be formed with a single subscriber device 513 associated to multiple expert devices 516.

In some embodiments, project controller 502 may optimize a matrix such that a device with a high number of successful interactions/transactions is identified and thus is assigned, by project controller 502, a subscriber device 513 opportunity.

In some embodiments, at communication management engine 503 may bring together expert device 516 and subscriber device 513 at a time an interaction is received from subscriber device 513.

A scoring system may be used that allows subscriber devices 513 to ask questions and reward the expert device 516 who are most qualified to answer the questions, positioning them as the expert device 516 that potentially gets business transactions associated to the subscriber devices 513.

The communication control computer 501 may simultaneously compute device scores (as described in FIGS. 8-9), to form or complete a relationship matrix, and enable communication between devices at the time the subscriber device 513 has acted.

In the ask the expert scenario; a complex arrangement may be processed by completing a plurality of scores simultaneously.

In some embodiments, question objects may be received from subscriber devices 513, whereby computer 501 may direct the questions to expert device 516 whose profile indicate that they are most qualified; further, computer 501 may store associated response objects into FAQ database 514 so that the next time that question is asked a similar response pattern may be employed. In this regard, the expert device 516 who supplied the response object as well offer the winning expert device 516 the question object; provided the question object belongs to the market area of the expert device 516.

Some bots known in the art may have difficulty in automatically responding to the question objects accurately, accordingly, the question objects may be directed to an expert device 516 to provide a supervised response in real-time. In this regard, the computer 501 determines the context of the question object being asked. The algorithm variable in this case is a question object being asked and thus detected.

Another example would be questions that had to do with, for example, mortgage financing where the algorithm includes a device with skills in mortgage, or another example where we would have a legal person, a title person, and so on. In this case, we have a computer algorithm built that may include professionals in associated verticals.

The scoring of devices may occur when a subscriber device 513 wants to act. Further, the scoring of devices may factor and associate the type of activity of the subscriber device 513 request.

The first scoring methodology by communication control computer 501 uses a computer algorithm to complete a relationship matrix with the most qualified expert device 516. The relationship matrix is created via registered devices that are dynamically linked.

In some embodiments, the initial variables may include a total number of devices registered, average usage of each device and location of devices. Dynamic subscriber device 513 growth and system usage averages as well location may be unpredictable and may happen simultaneously. Subscriber devices 513 may have total control over algorithms being performed. Ultimately when a change in scoring takes place, the changes are realized through the methods described herein.

Other variables may be included in the scoring methodology. For example:
- Cumulative time used by each subscriber device 513 in application usages (along with the cumulative time in the hierarchy of the subscriber device which includes both direct and indirect devices of the subscriber device);
- A total number of subscriber devices 513 registered (both direct and indirect devices);
- Device location; and
- Weighting; for example, a direct subscriber device 513 is weighted higher than indirect subscriber devices 513.

With additional variables, scoring may be adapted between devices to provide a higher variance. Algorithm variables may include years of experience and or enhanced credentials such as, in a real-estate embodiment, a broker in real estate. Another location variable may be the amount of time a device was reviewing a product (for example, a home in the case of real estate embodiment), in a particular, geolocation such as zip code or neighborhood. Another variable would be the price range of a home or a home-style (for example, Victorian, Tudor, loft, etc.) whereas one device is reviewing properties in a certain price range or reviewing properties with a particular home style. These variables are available for selection at the time of registration.

A second scoring system aka "ask the expert" may provide a subscriber device 513 an opportunity to ask questions and to have them answered by the most qualified as well the highest EAS scoring expert device 516 in their market area. In the ask the expert scenario, a plurality of relationship matrices may be simultaneously created. In this regard, several variables may be added to the algorithm such as credentials (i.e., a broker) and length of time in the business.

In some embodiments, scoring subscriber devices 513 to reward subscriber devices 513 for participating may be employed.

In some embodiments, predictive analytics for the likelihood of a communication attempt by a subscriber device 513 may be employed.

In some embodiments, identifying and weighing the devices differently that are "gaming the system."

In some embodiments, an AI chatbot where the chatbot places a template in front of the user with several acts may be employed. Other embodiments to identify and weigh the devices are contemplated and are within the scope of the present disclosure.

According to a preferred embodiment of the invention, one or more secondary affinity groups or external affinity groups may be further identified for a requesting device 510, requesting communication with a subscriber device 513, when an affinity group(s) of subscriber device 513 does not comprise requesting device 510. For example, in a scenario wherein requesting device 510 is requesting communication with subscriber device 513 and requesting device 510 is not directly or indirectly connected to subscriber device 513 in any hierarchical manner (i.e., the requesting device is non-existent in the subscriber device's affinity group), communication control computer 501 may thereby identify one or more secondary affinity groups (or, in some implementations, external affinity groups) associated with other like-devices (herein communication devices 530) that may have an existing hierarchical relationship with requesting device 510.

In an implementation, a requesting device 510 requesting a communication with subscriber device 513 and not comprised within an affinity group of subscriber device 513 may be further analyzed (e.g., in addition to analysis described in the aforementioned for creating a network pairing between two electronic communication devices 530), to identify hierarchical indices for subscriber device 513 that may be then utilized by communication control computer 501 to compute a confidence score of requesting device 510, such that the higher the confidence score, the higher the probability of requesting device 510 being provided a network interlink with subscriber device 513 by communication control computer 501.

In one embodiment, the confidence score may be determined based on one or more of identification values, internal or external affinity group scores, and subscriber access scores, in some embodiments. In other embodiments, one or more supplemental factors may also be used by communication control computer 501 to compute the confidence score. Such supplemental factors are contemplated and within the scope of the present invention. The scoring of requesting devices 510 for establishing network interlinks with subscriber devices 513, are as detailed in FIGS. 11 and 12.

Turning now to FIG. 11, an exemplary method for creating regulated network interlinks between electronic communication devices using internal affinity groups is illustrated, according to a preferred embodiment of the invention.

According to the embodiment, the method may start at step 1101, wherein communication control computer 501 may obtain a communication object from a requesting device 510. In an embodiment, the communication object may be obtained when requesting device 510 attempts to communicate with a target subscriber device 513. In the embodiment, project controller 502 may receive the communication object which may comprise one of a video call, a text message, an email, a voice call, a multimedia message, an AI-based chatbot session or a combination thereof.

Next, communication management engine 503 may determine whether requesting device 510 has a previously identified hierarchical relationship with target subscriber device 513. In the embodiment shown in FIG. 11, communication management engine 503, in order to determine whether requesting device 510 has a previously defined hierarchical relationship with target subscriber device 513, in a next step 1102, communication management engine 503 may determine whether requesting device 510 is comprised within a primary affinity group of target subscriber device 513. Hierarchical relationship-based affinity groups may be created for communication devices 530, as described in conjunction with FIG. 10.

In an implementation, each subscriber device 513 may be associated with a primary affinity group at least comprising one or more communication devices 530 that may have been determined by communication control computer 510 based on one or more of subscriber device 513 preferences (for example, initially set up in the initial registration) matching one or more parameters of communication devices 530. Although numerous possible preferences may be included, in a preferred embodiment, a major emphasis of scoring communication devices 530 may be focused, for example, on computing subscriber access scores for subscriber devices 513 or expert attribute score for expert devices 516 (as described in the foregoing).

Referring again to FIG. 11, in case the primary affinity group associated with target subscriber device 513 does not comprise requesting device 510, communication management engine 503 may identify one or more secondary affinity groups that may have a communication relationship with requesting device 510. In one implementation, the secondary affinity groups may each be associated with a communication device 530 (e.g., another subscriber device 513) that may or may not have an existing hierarchical relationship with target subscriber device 513.

Once one or more secondary affinity groups are identified by communication management engine 503, in a next step 1104, project controller 502 may calculate an internal affinity group score (IAGS) that aggregates component contributions for each secondary affinity group identified, based on one or more parameters related to how each secondary affinity group relates to both target subscriber device 513 and requesting device 510, respectively. In an embodiment, project controller 502 may calculate the IAGS across all secondary affinity groups, using the following exemplary sequence:

$$IAGS = \left\{ \sum (i = 1 \text{ to } n) \left( \frac{Vol_i}{Wt_i} \right) \right\} / \left\{ \sum (i = 1 \text{ to } n)(Vol_i) \right\};$$

wherein "i" denotes an index of the secondary affinity group being calculated; "n" is a number of secondary affinity groups being aggregated; "$Vol_i$" denotes a quantified volume of recorded interactions in a given secondary affinity group for a requesting device; and "$Wt_i$" denotes a predetermined weighted value for a secondary affinity group based on a hierarchical index of the secondary affinity group as related to the targetsubscriber device 513).

In the above exemplary sequence, in some implementations, the index may be a counter that may be incremented for each secondary affinity group identified by communication management engine 503. Further, once all secondary groups are identified by incrementing the counter (e.g., n number of total secondary affinity groups), a cumulative value of all recorded interactions of requesting device 510 with a communication device 530 associated with each affinity secondary group may be determined by project controller 502. In an embodiment, the cumulative value may be calculated by project controller 502 on the basis of one or more factors, including but not limiting to, previously recorded call logs between requesting device 510 and the communication device 530, messaging history between requesting device 510 and the communication device 530, contact information of requesting device 510 identified in a contact list of the communication device 530 and the like. Based on one or more of above parameters, project controller 502 may determine a quantitative value of volume of recorded interactions of requesting device 510 with the communication device 530.

In another embodiment, the IAGS may further be determined based on a predetermined weighted value for a secondary affinity group generated using a hierarchical index of target subscriber device 513.

In an implementation, the hierarchical index of target subscriber device 513 may be generated by project controller 502 based on a relevance score computed for each communication device 530. In an embodiment, the relevance score for a given communication device 530 may be indicative of a quantitative value of familiarity of target subscriber device 513 with the communication device 530. In the embodiment, in order to generate the hierarchical index of target subscriber device 513, each communication device 530 (e.g., other subscriber devices 513, and/or expert devices 516) may be divided into four tiers, i.e., tier 1 devices, tier 2 devices, tier 3 devices, and tier 4 devices in order of decreasing relevance values (e.g., based on an assigned priority), wherein:

Communication devices 530 directly connected to target subscriber device 513 may be categorized as tier 1 devices;

Communication devices 530 indirectly connected to target subscriber device 513 through one other communication device 530 may be categorized as tier 2 devices;

Communication devices 530 not connected to target subscriber device 513 however having data relationships with target subscriber device 513 may be categorized as tier 3 devices; and Other communication devices 530 not connected to target subscriber device 513 may be categorized as tier 4 devices.

Based on the division of communication devices 530 into the above tiers by project controller 502, a hierarchical index (e.g., as described in conjunction with FIG. 10) is created for target subscriber device 513. Further, affinity groups associated with each communication device 530 may also be identified (i.e., which communication device 530 has what hierarchical relationships with other communication devices 530 and requesting device 510) and the IAGS for requesting device 510 may be calculated by project controller 502 using the exemplary sequence described in the foregoing. That is, the hierarchical index for target subscriber device 513 as well as identified affinity groups for other communication devices 530 may be used by project controller 502 to compute a component contribution to TAGS of each identified secondary affinity group associated with a given communication device 530. It may be noteworthy, that a component contribution for a primary affinity group (i.e., for an affinity group of target subscriber device 513 itself) may be defaulted to be always greater than the aggregate of the component contributions for all of the secondary affinity groups combined, when computing the IAGS.

Referring again to FIG. 11, in a next step 1105, project controller 502 may determine whether the computed TAGS exceeds a predetermined threshold value. The predetermined threshold, in one embodiment, may be a value ranging between 0 and 100 and can be indicative of a quantified measure of a relative 'weight' that a volume of recorded interactions between requesting device 510 and a given communication device 530 is allocated, based on a relevance of the communication device 530 to target subscriber device 513.

Once it has been determined, by project controller 502, that the IAGS for requesting device 510 exceeds the predetermined threshold, in a next step 1106, a handling criteria is determined for the communication object received from requesting device 510. For instance, communication control computer 501 may handle each communication object differently based on the type of communication object received. While some of the communication objects may be directly transmitted by communication management engine 503 to target subscriber device 513, others may undergo one or more scrutinization steps before such transmission. For example, where the communication object comprises of a voicemail, the handling criteria may include allowing voicemail to be transmitted to target subscriber device 513 at a certain time period, holding voicemail transmission to target subscriber device 513 till a given time period, moving voicemail to a message queue and/or marked datastore at the subscriber device 513, and the like.

Based on the handling criteria, in a next step 1107, a network interlink for requesting device 510 may be created by project controller 502, so as to enable communication between requesting device 510 and target subscriber device 513. Further, in next step 1108, the communication object may be transmitted from requesting device 510 to target subscriber device 513 based on the handling criteria.

Referring again to step 1102 of FIG. 11, if it is determined by project controller 502 that requesting device 510 is present in a primary affinity group of target subscriber device 513, in a next step communication management engine 503 may gather subscriber information and one or more preferences for target subscriber device 513. In an embodiment, communication management engine 503 may gather stored subscriber information pertaining to target subscriber device 513, including but not limited to connection preferences as well as time zone, location, and configuration data associated with target subscriber device 513. In another embodiment, communication management engine 503 may also extract passive information related to target subscriber device 513, such as connection preferences, from one or more external databases, such as external database 517 as well as dynamic information such as location and time zone data, by actively pinging target subscriber device 513 in real-time, whenever a communication object is destined to target subscriber device 513.

In a next step 1110, communication management engine 503 may generate subscriber filter criteria for target subscriber device 513 based at least on the gathered subscriber device information and preferences. In an embodiment, subscriber filter criteria may be generated by communication management engine 503 in order to determine handling criteria for the communication object, in one implementation, based on the type of the communication object. For instance, communication management engine 503 may handle each communication object differently based on the type of communication object. In several embodiments, subscriber filter criteria may be generated by communication management engine 503 based on type of the communication object, day and time of receipt of the communication object, current location of target subscriber device 513, and the like. In one embodiment, the subscriber filter criteria may include day and time-based filters, e.g., forwarding of communication objects between 11 PM and 7 AM may be disallowed. Similarly, all communication objects may be blocked except for the ones labeled as 'emergency.'

In a next step 1111, project controller 502 may determine whether the subscriber filter criteria are met by requesting device 510. In case it is determined by project controller 502 that the subscriber filter criteria are met by requesting device 510, in a next step 1112 project controller 502 may compute a subscriber access score (SAS) for requesting device 510. As described in the foregoing, the SAS may be computed by project controller 502 using the following exemplary sequence:

$$SAS = \frac{\text{sum}\{i = 1 \text{ to } n\} \{(contactwt(i) * Ncontacts(i) + DurationWt(i) * ContactDuration(i)) * AffinityGroupWt(i)\}}{NF}$$

wherein NF denotes normalization factor, and contactwt(i) is the weighting given to the number of contacts for the 'ith' primary affinity group, Ncontacts(i) is the number of contacts within the 'ith' primary affinity group, DurationWt(i) is the duration weighting for the 'ith' primary affinity group, ContactDuration(i) is the total duration of the contacts within the 'ith' primary affinity group, and AffinityGroupWt(i) is the weighting assigned to the 'ith' primary affinity group.

In a next step 1113, project controller 502 may determine whether the SAS for requesting device 510 is greater than or equal to a predetermined threshold value. In an embodiment, the threshold value may be generated based on a set of parameters such as time of day, day of week, target subscriber device 513 location, target subscriber device 513 status, calendar content associated with target subscriber device 513, etc.

If the SAS for requesting device 510 is greater than or equal to the predetermined threshold, the method may continue to step 1106 wherein communication management engine 503 may further determine handling criteria for the communication object. In several preferred embodiments of the present invention, in order to facilitate additional layers of control for target subscriber device 513 over which other communication devices 530 may communicate with them over preferred communication channels at specified times, the determination of handling criteria by communication management engine 503 may be augmented using multiple parameters, specifically restricted access values (RAV), confidence scores, identification values, or a combination thereof, for requesting devices 510 requesting creation of network interlink with target subscriber device 513. Parameters other than those listed above may also be used and are therefore within the scope of the present invention.

Referring again to FIG. 11, when SAS for requesting device 510 is greater than or equal to the predetermined threshold value, communication management engine 503 may determine handling criteria for the communication object received from requesting device 510 and project controller 502 may transmit the communication object to target subscriber device 513 using a network interlink between requesting device 510 and target subscriber device 513.

In an embodiment, as described above, the determination of handling criteria may be augmented using an RAV computed for requesting device 510 by communication management engine 503. In an implementation, RAV may be a measure of a number of times requesting device 510 has been blocked from future access by other communication devices 530, as compared to a number of total affinity groups that comprise requesting device 510 as an active member. Further, these parameters may be further modified by a quantified measure of familiarity of requesting device 510 with target subscriber device 513, as given by the relevance value for requesting device 510 computed based on the tiered relationships between communication devices 530 described above.

In an embodiment, the RAV may be computed by project controller 502 for any requesting device 510 using the following exemplary sequence:

$$RAV = \frac{Nblocks}{[Nblocks + NAG]},$$

wherein Nblocks is a total number of times a requesting device 510 has been blocked from future access by other communication devices 530 and NAG denotes a total number of affinity groups being aggregated.

Nblocks, in one implementation, may be determined by project controller 502 using the following exemplary sequence:

$$Nblocks = \sum (i = 1 \text{ to } n)\left\{\frac{block_i}{n}\right\},$$

Wherein i denotes a counter value of an internal affinity group being calculated; n denotes a number of internal affinity groups being aggregated; Block, denotes an individual recorded occurrence of a given communication device 530 device blocking requesting device 510 from future access; and $Wt_i$ denotes a weight of the given communication device 530 based on its respective relevance score with respect to target subscriber device 513.

Further, NAG may be computed by project controller 502 using the following exemplary sequence:

$$NAG = \sum (i = 1 \text{ to } n)\left\{\frac{AG_i}{m}\right\},$$

wherein i denotes an index of internal affinity group being calculated that is associated with a communication device 530; m denotes a number of internal affinity groups being aggregated; AG, denotes an individual affinity group for the communication device 530 that comprises the requesting device 510 as an active member; and $Wt_i$ denotes a weight of the given communication device 530i based on its respective relevance score to target subscriber device 513.

In another embodiment, the determination of the handling criteria for the communication object received from requesting device 510 may further be augmented by communication management engine 503 using a confidence score computed for requesting device 510. In an embodiment, the confidence score for any requesting device 510 may be computed by project controller 502 using the following exemplary sequence:

$$CS = \frac{SAS + RAV + IAGS + EAGS}{4},$$

wherein SAS denotes a subscriber access score for requesting device 510, RAV is the restricted access value for requesting device device 510, IAGS is the internal affinity group score for requesting device 510, and EAGS is an external affinity group score for requesting device 510 (as described in FIG. 12).

In another embodiment, the determination of the handling criteria for the communication object received from requesting device 510 may further be augmented by communication management engine 503 using an identification value computed for requesting device 510. In one example, the identification value for any requesting device 510 may be computed by project controller 502 using the following exemplary sequence:

Identification Value=Min([Σ(i=1 to n){
(IdentityType$_i$*$Wt_i$)}],100), wherein Identitytype$_i$ denotes a type of identification associated with therequesting device 510 and $Wt_i$ denotes a fixed weight based on whether Identitytype$_i$ is determined for the communication device 510.

For example, $Wt_i$ may be given a value of 1 if IdentityType$_i$ is determined and associated with requesting device 510 and a value of 0 if IdentityType$_i$ is undetermined. Further, types of identification, as measured by IdentityType$_i$ may include System device ID for requesting device 510, name of an owner of requesting device 510, an email address associated with requesting device 510, a phone number associated with requesting device 510, a date of birth of the owner associated with requesting device 510, a mailing address associated with requesting device 510, and/or social media IDs associated with requesting device 510.

In yet another embodiment, the determination of the handling criteria by communication management engine 503 may be augmented based on a combination of one or more of the above-described scores. For instance, the determination of the handling criteria may be augmented based on a combination of identification values and confidence scores, together taken as an identity score for requesting device 510. In an implementation, the identity score for requesting device 510 may be indicative of a measure of level of certainty that communication control computer 501 can utilize to identify the requesting device 510 device as trustworthy. The identity score, in one implementation, can be generated by project controller 502 as a pair of values, i.e., an identification value computed for requesting device 510 and a confidence Score computed for requesting device 510. The identification value for any communication device 530, as described above, may lie within a numerical range, for example, between 0 to 100, wherein 0 may indicate no identification information about requesting device 510 and a value of 100 may indicate reasonable certainty about the identity of requesting device 510. Similarly, confidence scores for any communication device 530 may range between numerical values of −100 to 100. In an implementation, the absolute value of the confidence score may indicate a quantified level of confidence in a measure of trustworthiness, wherein −100 indicating requesting device 510 as completely untrustworthy, 0 having no directional information regarding trustworthiness, and 100 indicating communication device 530 as reasonably trustworthy. A cumulative range of values for the identity score may then be accordingly determined by project controller 502.

Based on the identity score matching or exceeding a predefined threshold range (as identified from the cumulative range of values), communication management engine 503 may redetermine the handling criteria for the communication object received from requesting device 510. This redetermined handling criteria is then used to convey the communication object from requesting device 510 to target subscriber device 513.

It is worth noting that the conveyance of communication object obtained from requesting device 510 to target subscriber device 513, using not only additional secondary affinity groups but augmentation by using a set of definite scores may be advantageous in controlling and mitigating unsolicited communication attempts from requesting device 510, even when no communication relationships are identified between requesting device 510 and target subscriber device 513. On the other hand, based on the multi-layered determination of handling criteria described in the foregoing, genuineness of every communication attempt to target subscriber device 513 may be acknowledged even when no previous communication relationship between target subscriber device 513 and requesting devices 510 is determined by communication control computer 501.

In an embodiment, referring back to step 1113, if the SAS for requesting device 510 is not greater than equal to the predetermined threshold value, in a next step 1114, project controller 502 may move the communication object to an unsolicited communications datastore or directory (not shown) associated with target subscriber device 513, e.g., voicemail, unsolicited email folder, or other automatic disposition that may be internal or external to subscriber device 513.

Turning now to FIG. 12, an exemplary method for creating regulated network interlinks between electronic communications devices using external affinity groups is illustrated, according to a preferred embodiment of the invention.

The method may begin at step 1210 wherein a communication object is received from a requesting device 510, the communication object destined for a target subscriber device 513. In a next step 1211, communication management engine 503 may determine whether a primary affinity group associated with target subscriber device 513 comprises requesting device 510. In case it is determined by communication management engine 503 that the primary affinity group associated with target subscriber device 513 comprises requesting device 510 (i.e., requesting device 510 is listed as an active member of a hierarchical index of target subscriber device 513), the method may continue to step 1109 of FIG. 11, wherein communication management engine 503 may gather subscriber device 513 information and preferences to determine how the communication object is to be handled by communication management engine 503.

Otherwise, in a next step 1212 communication management engine 503 may identify one or more secondary affinity groups associated with other communication devices 530 that may or may not have a previous communication relationship with target subscriber device 513 (as described in FIG. 11). In a next step 1213, communication management engine 503 may determine if one or more secondary affinity groups are found. If secondary affinity groups are found, the method may continue to step 1104 of FIG. 11, wherein IAGS for each secondary affinity groups may be computed by project controller 502 to determine handling criteria for the communication object received from requesting device 510. As described in the foregoing, the primary affinity group and the secondary affinity groups may collectively be identified as internal affinity groups, i.e., affinity groups that have associated information recorded and stored within one or more datastores associated with communication control computer 501.

However, if it is determined by communication management engine 503 that no secondary affinity groups are identified, in a next step 1214, one or more external affinity groups may be identified. In an embodiment, an external affinity group may be indicative of communication relationships between requesting device 510 with other communication devices 530 that are not found within internal affinity groups of such communication devices 530.

In one embodiment, an external affinity group may be identified within one or more external networks such as social media connections between communication devices 530, e.g., Facebook, Instagram, Twitter, LinkedIn, or other public media.

Further, a communication relationship between two communication devices 530, determined using social media groups or other external network connections may comprise a mapping between social media account credentials and in some examples, a name, a phone number, an email address, etc. that may identify requesting device 510. Such mappings may then be utilized by communication control computer 501 to identify whether requesting device 510 is a trustworthy device and what handling criteria may apply to the communication object received from 510 before taking a decision on whether the communication object is to be transmitted to target subscriber device 513 or not.

In an embodiment, these mappings identified using external networks, may be used by communication control computer 501 to identify external affinity groups and determine one or more scores using these external affinity groups (e.g., EAGS, confidence scores, identification values, SAS, etc.) that may then be utilized by communication engine 503, in various exemplary implementations, to determine whether network interlink between requesting device 510 and target subscriber device 513 may be created for transmission of the communication object. Advantageously, the use of internal affinity groups in tandem with external affinity groups to gather information both from within communication control computer 501 and externally for requesting device 510 may provide an additional layer of confidence mapping thereby facilitating identification and mitigation of unsolicited communication attempts.

Once one or more external affinity groups are identified, in a next step 1215, project controller 502 may compute an external affinity group score (EAGS) for each identified external affinity group. In an embodiment, the EAGS for requesting device 510 across all identified external affinity groups may be computed by project controller 502 using the following exemplary sequence:

$$EAGS = (\Sigma(i=1 \text{ to } m)[\Sigma(j=1 \text{ to } k)(Vol_{ij} * Sen_{ij} * Wt_{ij})]) / (\Sigma(i=1 \text{ to } m)[\Sigma(j=1 \text{ to } k)(Vol_{ij} * 100)]),$$

wherein i denotes a counter value of each external network; m denotes a total number of external networks being aggregated; j represents a counter value of each external affinity group found within the external network; k denotes a total number of external affinity groups being aggregated; $Vol_{ij}$ represents a volume of communications of a communication device 530 identified from a given external affinity group within an external network; $Sen_{ij}$ denotes a value of sentiment analysis of communications within an external affinity group within an external network and $Wt_{ij}$ denotes a weighted value of an external affinity group derived using a hierarchical index of requesting device 510 (for the embodiment described herein, a hierarchical index of target subscriber device 513 may be used as described with respect to FIG. 12). Sentiment analysis (or opinion mining) scoring, in an embodiment, may be performed by communication management engine 503 using one or more natural language processing (NLP) techniques to determine whether a given set of data metrics is positive, negative or neutral (each assigned respective numerical parameters). In an embodiment, sentiment analysis may be used by communication management engine 503 to determine if a sentiment associated with requesting device 510 is positive, negative or neutral with respect to each external affinity group j, associated with a communication device ij that is identified in the external network i being examined. The sentiment value may be accordingly computed by project controller 502.

Referring again to FIG. 12, once project controller 502 computes the EAGS for requesting device 510, in a next step 1216, project controller 502 may determine whether the EAGS is greater than or equal to a predetermined threshold. In an embodiment, the predetermined threshold may be a value between 0 and 100 and indicative of a measure of a relative 'weight' that a 'volume' of recorded interactions of between requesting device 510 and various communications devices 530 within an external affinity group is allocated, based on the relevance value of each communication device 530 to target subscriber device 513. If the EAGS is greater than that predetermined threshold, in a next step 1217, communication management engine 503 may determine handling criteria for the communication object using the EAGS, as well as augment determination of the handling criteria by computing a confidence score for requesting device 510. In an implementation, as described in the foregoing, the confidence score may be computed using one or more of EAGS, IAGS, SAS, RVS, or a combination thereof. Further, determination of handling criteria may also be augmented for the communication object received from requesting device 510 by using other scores such as an identity score for requesting device 510 that may be computed based on a combination of identification values and confidence scores associated with requesting device 510, as described with respect to FIG. 11.

Based on determination of the handling criteria for the communication object, in a next step 1218, communication management engine 503 may create a network interlink between requesting device 510 and target subscriber device 513. Further, in a next step 1219, communication management engine 503 may transmit the communication object to target subscriber device 513 using the network interlink.

Referring again to steps 1214 and 1216, if no external affinity groups are found or the EAGS is not greater than or equal to the predetermined threshold, communication management engine 503 may reject the communication request from requesting device 510 and forward the communication object to an 'unsolicited connection request' datastore (step 1210).

In the methods and systems described herein, identifying primary and secondary affinity groups, and external affinity groups for any requesting device wanting to communicate with a target device will favorably allow for creating priority-based and completely regulated network interlink between the devices, in that the requesting devices can be scored based on where it is found in a hierarchical relationship with the target device, priority being given to direct primary connections, however secondary connections and external connections are also analyzed, with respect to their priorities based on their cumulative assigned scores, to provide a more holistic approach. Further, with such mechanisms in place, the computing systems described herein shall facilitate the end user's (i.e., target device's) complete control and regulatory authorities over which requesting device can contact them, on what dates and times, and using what modes of communication. For instance, where no reliable data is identified for any internal affinity groups associated with communication devices, external networks of said communication devices may also be analyzed to determine if a network interlink request for a given communication device is originating from a trustworthy requesting device. Further, the systems and methods disclosed herein not only identify affinity groups and external networks for communication devices, but rather score these groups and networks with multiple parameters to ensure that no unsolicited connection requests reach a target device, whilst safeguarding each and every genuine connection request in a more timely, autonomous, and effective manner than those of systems occurring in the state of the art.

In several embodiments of the present invention, the terms direct devices and indirect devices may be used to describe relationships between communication devices 530 (e.g., a requesting device 510 and subscriber devices 513). For instance, if a requesting device 510 has a valid token from a first subscriber device 513, the requesting device 510 is deemed to have a direct relationship or connection with the first subscriber device 513. However, if the requesting device 510 has a valid token from first subscriber device 513, but not from a second subscriber device 513, but the second subscriber device 513 has a valid token from the first subscriber device 513, then requesting device 510 is deemed to have an indirect relationship or connection with the first subscriber device 513. If requesting device 510 has no valid token directly from the first subscriber device 513, nor from any communication device 530 directly connected to the first subscriber device, the requesting device is identified as having no relationship or connection to the first subscriber device 513. Such relationships may be defined by communication control computer 501 for each communication device 530.

Further, an affinity group may comprise a set of communication devices 530 that have direct relationships with a focal communication device 530. Furthermore, an active member of an affinity group is defined as a communication device 530 that currently has an active valid token for that affinity group (i.e., any valid token from the focal communication device 530). Similarly, an inactive member of an inactive affinity group is a communication device 530 that had a previously active but currently revoked valid token from the focal communication device 530.

In several embodiments of the invention, all communication devices 530 registered by communication control computer 501 cumulatively comprise the internal network. Further, external networks may consist of sets of communication devices 530 that are registered within each individual self-contained external public network, e.g., Facebook™ users, Twitter™ users, etc.

Other embodiments for providing priority-based regulated communication network interlinks are contemplated and within the scope of the present invention.

The skilled person will be aware of a range of possible modifications of the various embodiments described above. Accordingly, the present invention is defined by the claims and their equivalents.

What is claimed is:

1. A system for creating priority-based regulated network interlinks between electronic devices, the system comprising:
a network-connected communication computer comprising a memory and a processor and further comprising programmable instructions stored in the memory and operating on the processor, the instructions when executed by the processor, cause the processor to:
receive, from a first device, a communication object at least comprising a request to communicate with a second device;
identify whether the first device is comprised within a primary affinity group associated with the second device;
in response to a determination that the primary affinity group does not comprise the first device, identify one or more secondary affinity groups, each secondary affinity group associated with an electronic device different than the first and second devices;
across all secondary affinity groups identified, compute an aggregated internal affinity group score for the first device;
determine whether the aggregated internal affinity group score is greater than a first predetermined threshold value;
in response to a determination that the aggregated internal affinity group score is greater than the first predetermined threshold value, determine handling criteria for the communication object;
responsive to a determination that the communication object does not have a valid permission token associated therewith and at least one subscriber filter criteria is met by the first device, calculate a subscriber access score for the first device;
augment the handling criteria with the subscriber access score;
create a network interlink between the first device and the second device based on the augmented handling criteria; and
transmit, via the network interlink, the communication object to the second device.

2. The system as claimed in claim 1, wherein the aggregated internal affinity group score for across all secondary affinity groups is computed using one or more of:
a counter value assigned to a secondary affinity group;
a total number of the one or more secondary affinity groups being aggregated;
a quantified measure of volume of interactions for the first device found within the secondary affinity group; and
a weighted value of the secondary affinity group derived using a hierarchal index linked to the second device.

3. The system as claimed in claim 2, wherein the hierarchal index for the second device is generated based on a relevance score of a communication device to which the secondary affinity group belongs, the relevance score defining a quantitative value of familiarity of the second device with the communication device.

4. The system as claimed in claim 2, wherein the programming instructions when further executed by the processor, cause the processor to:
compute a restricted access value for the first device using one or more of:
the counter value assigned to the secondary affinity group;
the total number of the one or more secondary affinity groups being aggregated;
a count of restricted access events identified for the first device in a given secondary affinity group;
the weighted value of the secondary affinity group derived using the hierarchal index linked to the second device; and
further augment the handling criteria with the restricted access value prior to creating the network interlink.

5. The system as claimed in claim 4, wherein the programming instructions when further executed by the processor, cause the processor to:
in response to a determination that the primary affinity group does not comprise the first device, identify one or more external affinity groups from a plurality of external networks, each external affinity group associated with an electronic device different than the first and second devices;
across all external affinity groups identified, compute an aggregated external affinity group score for the first device;
determine whether the aggregated external affinity group score is greater than a second predetermined threshold value; and
in response to a determination that the aggregated external affinity group score is greater than the second predetermined threshold value, determine the handling criteria for the communication object.

6. The system as claimed in claim 5, wherein the programming instructions when further executed by the processor, cause the processor to:
compute a confidence score for the first device using one or more of the aggregated internal affinity group score, the restricted access value, and the aggregated external affinity group score;
compute an identity score for the first device based at least in part on the confidence score; and
further augment, the handling criteria with the identity score prior to creating the network interlink.

7. The system as claimed in claim 5, wherein the aggregated external affinity group score is computed using one or more of:
a counter value of each external network;
a total number of the plurality of external networks being aggregated;
a counter value of each external affinity group identified within an external network;
a total number of the one or more external affinity groups being aggregated;
a quantified measure of a volume of interactions for the first device found within a given external affinity group;
a sentiment analysis score for the first device within the external affinity group; and a weighted value of the external affinity group derived using a hierarchal index linked to the second device.

8. The system as claimed in claim 1, wherein in response to a determination that the primary affinity comprises the first device, the programming instructions when further executed by the processor, cause the processor to
further augment the handling criteria with historical data associated with the first user device prior to creating the network interlink.

9. The system as claimed in claim 8, wherein the programming instructions when further executed by the processor, cause the processor to:
in response to a determination that the valid permission token is associated with the communication object, transmit the communication object to the second device by creating the network interlink between the first device and the second device.

10. The system of claim 8, wherein the programming instructions when further executed by the processor, cause the processor to:
in response to the determination that the valid permission token is associated with the communication object, determine whether the first device is authorized; and
if the first device is authorized, forward communication object to be displayed on a graphical user interface and/or audio interface of the second device, based at least on a type of the communication object.

11. A computer-implemented method for creating priority-based regulated network interlinks between electronic devices, the method comprising:
receiving, from a first device by a communication control computer, a communication object at least comprising a request to communicate with a second device;
identifying, by the communication control computer, whether the first device is comprised within a primary affinity group associated with the second device;
in response to determining, by the communication control computer, that the primary affinity group does not comprise the first device, identifying, by the communication control computer, one or more secondary affinity groups, each secondary affinity group associated with an electronic device different than the first and second devices;
across all secondary affinity groups identified, computing, by the communication control computer, an aggregated internal affinity group score for the first device;
determining, by the communication control computer, whether the aggregated internal affinity group score is greater than a first predetermined threshold value;
in response to determining that the aggregated internal affinity group score is greater than the first predetermined threshold value, determining, by the communication control computer, handling criteria for the communication object;
responsive to a determination that the communication object does not have a valid permission token associated therewith and at least one subscriber filter criteria is met by the first device, calculating a subscriber access score for the first device;
augment the handling criteria with the subscriber access score;
creating, by the communication control computer, a network interlink between the first device and the second device based on the augmented handling criteria; and
transmitting, by the communication control computer via the network interlink, the communication object to the second device.

12. The method as claimed in claim 11, further comprising computing, by the communication control computer, the aggregated internal affinity group score using one or more of:
a counter value assigned to a secondary affinity group;
a total number of the one or more secondary affinity groups being aggregated;
a quantified measure of volume of interactions for the first device found within the secondary affinity group; and
a weighted value of the secondary affinity group derived using a hierarchal index linked to the second device.

13. The method as claimed in claim 12, further comprising generating, by the communication control computer, the hierarchal index for the second device based on a relevance score of a communication device to which the secondary affinity group belongs, the relevance score defining a quantitative value of familiarity of the second device with the communication device.

14. The method as claimed in claim 12, further comprising:
computing, by the communication control computer, a restricted access value for the first device using one or more of:
the counter value assigned to the secondary affinity group;
the total number of the one or more secondary affinity groups being aggregated;
a count of restricted access events identified for the first device in a given secondary affinity group;
the weighted value of the secondary affinity group derived using the hierarchal index linked to the second device; and
further augmenting the handling criteria with the restricted access value prior to creating the network interlink.

15. The method as claimed in claim 14, further comprising:
in response determining, by the communication control computer, that the primary affinity group does not comprise the first device, identifying, by the communication control computer, one or more external affinity groups from a plurality of external networks, each external affinity group associated with an electronic device different than the first and second devices;
across all external affinity groups identified, computing, by the communication control computer, an aggregated external affinity group score for the first device;
determining, by the communication control computer, whether the aggregated external affinity group score is greater than a second predetermined threshold value; and
in response to determining, by the communication control computer, that the aggregated external affinity group score is greater than the second predetermined threshold value, determining, by the communication control computer, the handling criteria for the communication object.

16. The method as claimed in claim 15, further comprising:
computing, by the communication control computer, a confidence score for the first device using one or more of the internal affinity group score, the restricted access value, and the aggregated external affinity group score;
computing, by the communication control computer, an identity score for the first device based at least in part on the confidence score; and further augmenting, by the communication control computer the handling criteria with the identity score prior to creating the network interlink.

17. The method as claimed in claim 15, further comprising computing, by the communication control computer, the aggregated external affinity group score using one or more of:
   a counter value of each external network;
   a total number of the plurality of external networks being aggregated;
   a counter value of each external affinity group identified within an external network;
   a total number of the one or more external affinity groups being aggregated;
   a quantified measure of a volume of interactions for the first device found within a given external affinity group;
   a sentiment analysis score for the first device within the external affinity group; and
   a weighted value of the external affinity group derived using a hierarchal index linked to the second device.

18. The method as claimed in claim 11, wherein in response to determining, by the communication control computer, that the primary affinity comprises the first device, the method further comprising the step of further augmenting the handling criteria with the historical data associated with the first user device prior to creating the network interlink.

19. The method as claimed in claim 18, further comprising:
   in response determining, by the communication control computer, that the valid permission token is associated with the communication object, transmitting, by the communication control computer, the communication object to the second device by creating the network interlink between the first device and the second device.

20. The method as claimed in claim 18, further comprising:
   in response to determining, by the communication control computer, that the valid permission token is associated with the communication object, determining, by the communication control computer, whether the first device is authorized; and
   if the first device is authorized, forwarding, by the communication control computer, communication object to be displayed on a graphical user interface and/or audio interface of the second device, based at least on a type of the communication object.

* * * * *